US009844000B2

(12) United States Patent
Chen et al.

(10) Patent No.: US 9,844,000 B2
(45) Date of Patent: Dec. 12, 2017

(54) SMALL CELL ENODEB ACCESS SYSTEM AND METHOD FOR REALIZING NETWORK ACCESS THEREFOR

(71) Applicant: ZTE CORPORATION, Shenzhen, Guangdong Province (CN)

(72) Inventors: Zhongming Chen, Shenzhen (CN); Yada Huang, Shenzhen (CN); Xiaojuan Shi, Shenzhen (CN); Zhongda Du, Shenzhen (CN); Dapeng Li, Shenzhen (CN)

(73) Assignee: XI'AN ZHONGXING NEW SOFTWARE CO., LTD. (CN)

( * ) Notice: Subject to any disclaimer, the term of this patent is extended or adjusted under 35 U.S.C. 154(b) by 12 days.

(21) Appl. No.: 14/893,767

(22) PCT Filed: Jul. 24, 2013

(86) PCT No.: PCT/CN2013/080035
§ 371 (c)(1),
(2) Date: Nov. 24, 2015

(87) PCT Pub. No.: WO2013/185683
PCT Pub. Date: Dec. 19, 2013

(65) Prior Publication Data
US 2016/0112945 A1 Apr. 21, 2016

(30) Foreign Application Priority Data
May 24, 2013 (CN) .......................... 2013 1 0198436

(51) Int. Cl.
H04W 80/04 (2009.01)
H04W 48/20 (2009.01)
(Continued)

(52) U.S. Cl.
CPC ........... *H04W 48/20* (2013.01); *H04W 16/32* (2013.01); *H04W 28/085* (2013.01);
(Continued)

(58) Field of Classification Search
CPC ............. H04W 72/1278; H04W 36/22; H04W 76/048; H04W 24/02; H04W 24/10;
(Continued)

(56) References Cited

U.S. PATENT DOCUMENTS

2008/0274736 A1* 11/2008 Hu .......................... H04W 8/12
455/433
2010/0322163 A1* 12/2010 Bhalla ............... H04W 36/0066
370/329
(Continued)

FOREIGN PATENT DOCUMENTS

CN 1461152 A 12/2003
CN 101686578 A 3/2010
(Continued)

OTHER PUBLICATIONS

Japanese Office Action dated Oct. 4, 2016 for Japanese Application No. 2016-514240.
(Continued)

*Primary Examiner* — Andrew Lee
(74) *Attorney, Agent, or Firm* — Plumsea Law Group, LLC

(57) ABSTRACT

Disclosed are a small cell eNodeB access system and a method for realizing network access therefor, including: setting up a control plane link and a user plane link respectively, the small cell eNodeB access system processing control plane data of access UE through the set up control plane link, and processing user plane data of an access UE via the set up user plane link. In the embodiment of the present invention, it makes the UE have data transmission
(Continued)

and reception with two different eNodeBs such as macro cell (eNodeB) and small cell (eNodeB) simultaneously by separating the control plane with the data plane, so as to increase the user throughput and enhance the mobility performance, and to solve the problem that the user switches between the cells so that information exchanges frequently between nodes and so as to cause an impact on the core network.

19 Claims, 12 Drawing Sheets

(51) Int. Cl.
| | |
|---|---|
| H04W 28/08 | (2009.01) |
| H04W 16/32 | (2009.01) |
| H04W 76/02 | (2009.01) |
| H04W 92/20 | (2009.01) |
| H04W 84/04 | (2009.01) |
| H04W 88/16 | (2009.01) |

(52) U.S. Cl.
CPC .......... *H04W 76/02* (2013.01); *H04W 84/045* (2013.01); *H04W 88/16* (2013.01); *H04W 92/20* (2013.01)

(58) Field of Classification Search
CPC ... H04W 16/32; H04W 48/16; H04W 76/021; H04W 48/20
See application file for complete search history.

(56) References Cited

U.S. PATENT DOCUMENTS

| | | | | | |
|---|---|---|---|---|---|
| 2012/0327867 | A1* | 12/2012 | Kela | .................. | H04W 72/082 370/329 |
| 2013/0326586 | A1* | 12/2013 | Zhu | ...................... | H04W 12/02 726/3 |
| 2014/0011519 | A1* | 1/2014 | Lee | ......................... | H04W 8/24 455/456.1 |
| 2014/0045491 | A1* | 2/2014 | Van Phan | ........... | H04W 84/005 455/426.1 |
| 2014/0328326 | A1* | 11/2014 | Gunnarsson | ...... | H04W 36/0083 370/331 |
| 2014/0342748 | A1* | 11/2014 | Zou | .................. | H04W 72/0426 455/452.1 |
| 2015/0029973 | A1* | 1/2015 | Vesterinen | ............ | H04W 88/06 370/329 |
| 2015/0341838 | A1* | 11/2015 | Pinheiro | ........... | H04W 52/0251 455/449 |
| 2016/0007255 | A1* | 1/2016 | Sharma | .................. | H04W 36/08 370/331 |
| 2016/0050646 | A1* | 2/2016 | Wang | ..................... | H04W 28/16 455/450 |

FOREIGN PATENT DOCUMENTS

| | | |
|---|---|---|
| CN | 102075859 A | 5/2011 |
| CN | 102395202 A | 3/2012 |
| JP | 2010063022 A | 3/2010 |
| JP | 2010187267 A | 8/2010 |

OTHER PUBLICATIONS

Li Zhaojun et al: "User Plane and Control Plane Separation Framework for Home Base Stations",Manuscript received Jun. 30, 2009, Fujitsu Scientific and Technical Journal, Jan. 31, 2010, pp. 79-86, XP055262160.

"3rd Generation Partnership Project;Technical Specification Group Radio Access Network; Evolved Universal Terrestrial Radio Access (E-UTRA) and Evolved Universal Terrestrial Radio Access Network (E-UTRAN); Overall description; Stage 2 (Release 11)" 3GPP TS 36.300 V11.5.0 (Mar. 2013), Mar. 15, 2013, pp. 1-209, XP050692265.

"3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12)", 3GPP TS 29.274 V12.0.0 (Mar. 2013), Mar. 12, 2013, pp. 1-228, XP050692017.

Hiroyuki Ishii et al: "A Novel architecture for LTE-B :C-plane/U-plane Split and Phantom Cell Concept" 2012 IEEE Globecom Workshops (GC WKSHPS 2012), Anaheim, California, USA, Dec. 3, 2012, pp. 624-630, XP032341446.

English description dated Mar. 28, 2012 of corresponding document CN102395202 A.

European Search Report dated Apr. 14, 2016 in European Patent Application No. EP 13804770.9.

The International Search Report and Written Opinion dated Feb. 27, 2014 in Application No. PCT/CN2013/080035.

\* cited by examiner

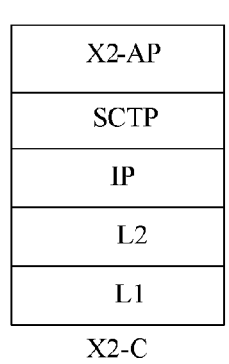
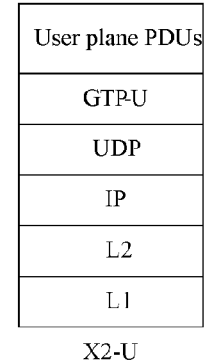
FIG. 2(c)   FIG. 2(d)
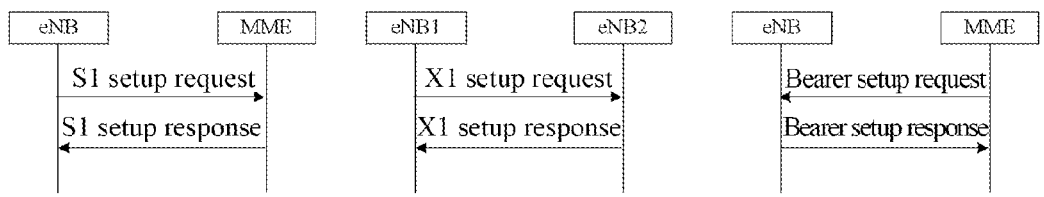
FIG. 3(a)   FIG. 3(b)   FIG. 3(c)
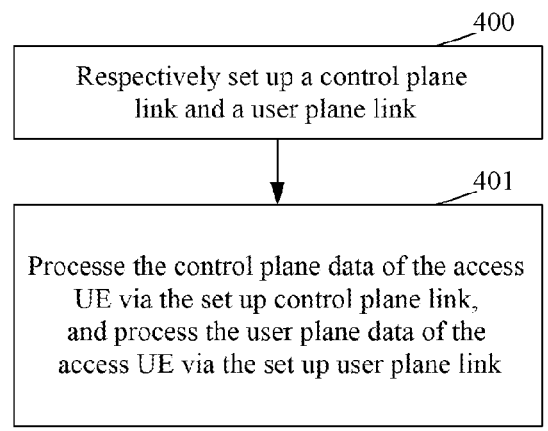
FIG. 4

SMALL CELL ENODEB ACCESS SYSTEM AND METHOD FOR REALIZING NETWORK ACCESS THEREFOR

CROSS-REFERENCE TO RELATED APPLICATION(S)

This application is the U.S. National Phase application of PCT application number PCT/CN2013/080035 having a PCT filing date of Jul. 24, 2013, which claims priority of Chinese patent application 201310198436.1 filed on May 24, 2013, the disclosures of which are hereby incorporated by reference.

TECHNICAL FIELD

The present document relates to the mobile communication technology, and more particularly, to a small cell eNodeB access system and a method for implementing network access therefor.

BACKGROUND OF RELATED ART

FIG. 1 is a schematic diagram of the overall architecture of a long-term evolution (LTE) system in the related art, and as shown in FIG. 1, the LTE architecture comprises: Mobility Management Entity (MME), Serving GetWay (SGW), user equipment (UE) or it is called as terminal, and eNodeB (referred to as eNB), and the UU interface is between the UE and the eNB, the S1-MME (S1 for the control plane) interface is between the eNB and the MME, the S1-U interface is between the eNB and the SGW, and the X2-U (X2-User plane) and X2-C(X2-Control plane) interfaces are between the eNBs.

FIG. 2(a)~FIG. 2(d) are schematic diagrams of a protocol architecture of the control plane and the user plane between the UE, the eNB and the core network (MME or SGW) in the LTE in the related art, as well as a protocol architecture of the control plane and the user plane between the eNB and the eNB, as shown in FIG. 2(a)~FIG. 2(d), In the LTE, the interfaces between the UE and the eNB from bottom to top can be divided into the following protocol layers: Physical (PHY) layer, Media Access Control (MAC) layer, and Radio Link Control (RLC) layer, Packet Data Convergence Protocol (PDCP) layer, and Radio Resource Control (RRC) layer. In the LTE, the user plane protocol stacks of the interfaces between the UE and eNB from bottom to top are divided into the following protocol layers: PHY, MAC, RLC, and PDCP. Wherein, the PHY layer is mainly set to transmit information to the MAC or higher layer via a transmission channel; the MAC layer is mainly set to provide the data transmission through a logical channel and be responsible for radio resource allocation and for achieving functions such as hybrid automatic repeat request (HARQ, Hybrid ARQ), Scheduling (SCH), priority processing and multiplexing/de-multiplexing (MUX); the RLC layer is mainly set to provide the user data and control data segmentation and retransmission services; the PDCP layer is mainly set to complete the user data transmission in the RRC or user plane; the RRC layer is mainly set to complete the broadcast, paging, radio resource control connection management, radio bearer control, mobility function, UE measurement report and control. In the LTE system, the UE can only transmit and receive data with one eNodeB, which undoubtedly limits the user throughput and mobility performance of the UE.

In the LTE, the protocol stack of S1-MME interface from bottom to top is divided into the following protocol layers: L1 protocol, L2 protocol, Internet protocol (IP), Stream Control Transmission Protocol (SCTP), and S1-Application Protocol (S1-AP).

In the LTE, the protocol stack of S1-U interface from bottom to top is divided into the following protocol layers: L1 protocol, L2 protocol, User Datagram Protocol/Internet Protocol (UDP/IP), GPRS Tunneling Protocol-User plane (GTP-U).

In the LTE, the protocol stack of X2-C interface from bottom to top is divided into the following protocol layers: L1 protocol, L2 protocol, IP, SCTP, X2-Application Protocol (X2-AP).

In the LTE, the protocol stacks of X2-U interface from bottom to top are divided into the following protocol layers: L1 protocol, L2 protocol, UDP/IP, GTP-U.

FIG. 3(a)~FIG. 3(c) are respectively schematic diagrams of existing S1 interface, X2 interface and enhanced radio access bearer (E-RAB) setup processes, wherein the S1 interface setup process generally comprises: the eNB sending a S1 SETUP REQUEST message to the MME, and the MME returning a S1 SETUP RESPONSE message to the eNB. The X2 interface setup process generally comprises: the eNB1 sending a X2 SETUP REQUEST message to the eNB2, and the eNB2 returning a X2 SETUP RESPONSE message to the eNB1. The radio access bearer setup process generally comprises: the MME sending an E-RAB SETUP REQUEST message to the eNB, and the eNB returning an E-RAB SETUP RESPONSE message to the MME.

Currently, due to the scarcity of spectrum resources, as well as the surge of mobile users in services with massive flow traffics, in order to increase user throughput and enhance mobility performance, the needs of using high-frequency point such as 3.5 GHz for hotspot coverage are increasingly obvious, and using the low-power node becomes a new application scenario. However, since the high-frequency signal attenuation is relatively severe, the coverage range of new cell is relatively small and does not share stations with the existing cells, and if a user moves between these new cells, or moves between the new cells and the existing cells, it will cause frequent switching process, making frequent user information transfer between the eNodeB, thus causing a great signaling impact on the core network, and further curbing the introduction of a large number of small cell eNodeBs at the radio side.

SUMMARY OF THE INVENTION

The embodiment of the present invention provides a small cell eNodeB access system and a method for implementing network access therefor to increase user throughput and enhance mobility performance of a UE; at the same time, when the UE moves, it is able to avoid a signaling impact on the core network, thereby achieving the introduction of a large number of small cell eNodeBs at the radio side.

To solve the abovementioned technical problem, the embodiment of the present invention discloses a small cell eNodeB access system, and the small cell eNodeB access system is provided with, a control plane gateway, which is connected to a radio access network and a core network, set to set up a control plane link between the core network and the radio access network; the control plane gateway works as an aggregation and distribution node of control plane signaling, aggregating signalings from different radio access network nodes and sending them to the core network, or distributing signalings from the core network to different radio access network nodes; and managing and coordinating one or more radio access network nodes;

a user plane gateway, which is connected to the radio access network and the core network, and set to set up a user plane link between the core network and the radio access network; the user plane gateway works as an aggregation and distribution node of user plane data, aggregating data from different radio access network nodes and sending them to the core network, or distributing data come from the core network to different radio access network nodes.

There is a connection link set up between the control plane gateway and the user plane gateway;

the control plane gateway is further set to control and manage the user plane gateway via the set up connection link.

Said controlling and managing the user plane gateway comprises: controlling the setup, deletion and modification of connections between the user plane gateway and the core network, as well as between the user plane gateway and the radio access network node.

There are one or more control plane gateways;

there are one or more user plane gateways.

The system further comprises a mobility management entity (MME) connecting with the control plane gateway, a serving gateway (SGW) connecting with the user plane gateway and the MME, a macro eNodeB connecting with the control plane gateway and the user plane gateway respectively, and a small cell eNodeB respectively connecting with the control plane gateway and the user plane gateway.

The user plane gateway and the control plane gateway are respectively independent physical nodes;

the MME is set to connect to the control plane gateway via a S1-MME1 interface, connect to the SGW via a S11 interface; and also set to support managing the control plane link with the control plane gateway;

the SGW is set to connect to the user plane gateway via the S1-U1 interface; and also set to support managing the S1-U1 interface connection with the user plane gateway;

the control plane gateway is set to connect to the MME via a S1-MME1 interface, and connect to the macro eNodeB and/or the small cell eNodeB via a S1-MM2 interface, connect to the user plane gateway via the X-1 interface; further set to support functions of managing the control plane link with the MME and managing the control plane link with the eNodeB, and set to manage the S1-U1 interface connection set up between the user plane gateway and the SGW, as well as the S1-U2 interface connection set up between the user plane gateway and the eNodeB;

the user plane gateway is set to connect to the SGW via the S1-U1 interface, connect to the macro eNodeB or the small cell eNodeB via the S1-U2 interface, connect to the control plane gateway via the X-1 interface; set to, under the control of the control plane gateway, support managing the S1-U1 interface connection with the SGW, as well as managing the S1-U2 interface connection with the eNodeB;

The macro eNodeB is set to connect to the control plane gateway via the S1-MME2 interface, and connect to the user plane gateway via the S1-U2 interface; further set to support managing the control plane link with the control plane gateway, and managing the S1-U2 interface connection with the user plane gateway;

the small cell eNodeB is set to connect to the user plane gateway via the S1-U2 interface, connect to the control plane gateway via the S1-MME2 interface; further set to support managing the control plane link with the control plane gateway, and managing the S1-U2 interface with the user plane gateway.

The control plane gateway is further set to connect to other control plane gateways via a X-C interface, used for an inter-node negotiation when moving across the control plane gateways.

The user plane gateway is further set to connect to other user plane eNodeBs via a X-U interface, used for transmitting data between nodes when moving across the user plane gateways.

The control plane gateway and the user plane gateway are co-located in the same physical entity, in this case, the X-1 interface between the control plane gateway and the user plane gateway is an internal interface.

The control plane gateway and the user plane gateway are co-located and set in the macro eNodeB;

the MME is set to connect to the macro eNodeB via the S1-MME1 interface, connect to the SGW via the S11 interface; further set to support managing the control plane link with the control plane gateway set in the macro eNodeB;

The SGW is set to connect to the macro eNodeB via the S1-U1 interface; further set to support managing the S1-U1 connection with the user plane gateway set in the macro eNodeB;

the macro eNodeB is set to connect to the MME via the S1-MME1 interface, and have the S1-U2 interface and the S1-MME2 interface between the small cell eNodeB and macro eNodeB; further set to support managing the control plane link with the small cell eNodeB, and support managing the S1-U2 connection with the small cell eNodeB;

the small cell eNodeB is set to have the S1-U2 interface and the S1-MME2 interface between the macro eNodeB and small cell eNodeB and connect to the UE via the Uu interface; also set to support managing the control plane link and the S1-U2 connection with the macro eNodeB.

The control plane gateway and the user plane gateway are co-located and set in the macro eNodeB, and also one gateway is set between the macro eNodeB and the small cell eNodeB, and it is also responsible for managing the control plane and the user plane of the small cell eNodeB;

the MME is set to connect to the macro eNodeB via the S1-MME1 interface, and connect to the SGW via the S11 interface; and further set to support managing the control plane link with the control plane gateway set in the macro eNodeB;

the SGW is set to connect to the macro eNodeB via the S1-U1 interface; further set to support managing the S1-U1 connection with the user plane gateway set in the macro eNodeB;

the macro eNodeB is set to connect to the MME via the S1-MME1 interface and set up the S1-U2 interface and S1-MME2 interface connections to the small cell eNodeB via a gateway; also set to support managing the control plane link with the gateway;

the gateway is set to support managing the control plane link and the user plane link with the eNodeB;

the small cell eNodeB is set to set up the S1-U2 interface and S1-MME2 interface connections with the macro eNodeB via the gateway; further set to support in setting up a data radio bearer (DRB) of LTE system with the UE and communicating in the DRB, and support managing the control plane link and the S1-U2 interface connection with the gateway.

A X-3 interface connection is also set up via the gateway between the macro eNodeB and the small cell eNodeB.

The control plane gateway is set in the macro eNodeB, and the user plane gateway is an independent entity;

the MME is set to connect to the macro eNodeB via the S1-MME1 interface, and connect to the SGW via the S11 interface;

the SGW is set to connect to the user plane gateway via the S1-U1 interface; also set to support managing the S1-U1 interface connection with the user plane gateway;

the macro eNodeB is provided with a control plane gateway; set to connect to the MME via the S1-MME1 interface, connect to the small cell eNodeB via the S1-MM2 interface, wherein interfaces between the macro eNodeB and the user plane gateway comprise the X-1 interface and the S1-U2 interface; it is further set to support managing the S1-U2 interface connection with the user plane gateway, support managing the control plane link with the small cell eNodeB; control the user plane gateway to manage the S1-U1 interface connection between the user plane gateway and the SGW, as well as the S1-U2 interface connection between the user plane gateway and the eNodeB;

the user plane gateway is set to connect to the SGW via the S1-U1 interface, connect to the macro eNodeB via the S1-U2 interface and the X-1 interface, connect to the small cell eNodeB via the S1-U2 interface; further set to support managing the S1-U1 interface connection with the SGW, as well as managing the S1-U2 interface connection with the eNodeB;

the small cell eNodeB is set to connect to the user plane gateway via the S1-U2 interface, connect to the macro eNodeB via the S1-MME2 interface; support in setting up a data radio bearer of LTE system with the UE and communicate on the DRB, as well as support managing the control plane link with the control plane gateway and managing the S1-U2 interface connection with the user plane gateway.

The macro eNodeB and the small cell eNodeB are also connected via the X-3 interface.

The user plane gateway is set in the SGW; the control plane gateway is set in the MME;

the MME is provided with a control plane gateway; and it is set to connect to the SGW via the S11 interface and the X-1 interface, and respectively connect to the macro eNodeB and the small cell eNodeB via the S1-MME2 interface; also set to support managing two S1-MME2 interfaces for one user to respectively connect to different eNodeBs;

the SGW is provided with a user plane gateway; and it is set to connect to the MME via the S11 interface and the X-1 interface, and respectively connect to the macro eNodeB and the small cell eNodeB via the S1-U2 interface; and further set to support managing two S1-U2 interfaces for one user to respectively connect to different eNodeBs.

The embodiment of the present invention further provides a method for a small cell eNodeB access system implementing network access, and the small cell eNodeB access system is provided with, a control plane gateway, which connects to a radio access network and a core network, and is set to set up a control plane link between the core network and the radio access network;

a user plane gateway, which connects to the radio access network and the core network, and is set to set up a user plane link between the core network and the radio access network;

the method comprises:

respectively setting up the control plane link and the user plane link;

processing control plane data of an access UE through the set up control plane link, and processing the user plane data of the access UE through the set up user plane link.

The method further comprises: setting up a connection link between the control plane gateway and the user plane gateway;

through the set up connection link, the control plane gateway controlling and managing the user plane gateway.

The control plane gateway controlling and managing the user plane gateway comprises:

setting up, deleting, and modifying a connection between the user plane gateway and the core network, as well as, setting up, deleting and modifying a connection between the user plane gateway and a radio access network node.

There are two or more user plane gateways; the method further comprises:

setting up connection links between the user plane gateways; through the set up connection links, implementing transmitting data between nodes when the UE moves across the user plane gateways.

The method further comprises:

the control plane gateway completing an inter-node negotiation via the connection link when the UE moves across the control plane gateways.

Said processing the control plane data of the access UE via the set up control plane link comprises:

via the set up control plane link, the control plane gateway processing the control plane data, aggregating signalings from different radio access network nodes and sending them to the core network, or distributing signalings from the core network to different radio access network nodes.

The aggregating or distributing comprises:

managing signaling connections between the core network and the control plane gateway, as well as the control plane gateway and the radio access network nodes;

maintaining UE-related context information, comprising mapping relationships of signaling connections between the core network and the control plane gateway, as well as between the control plane gateway and the radio access network nodes;

managing the signaling connections according to the signalings of the core network or the radio access network nodes.

When the UE supports multiple streams, the UE stores the signaling connections between the control plane gateway and multiple radio access network nodes.

A connection link is set up between the control plane gateway and the user plane gateway;

the method further comprises: instructing the user plane gateway to manage the corresponding data connection.

The mapping relationship is one-to-one mapping relationship; forwarding the signaling according to the mapping relationship; or, the mapping relationship is one-to-many relationship mapping, forwarding by proxy the signaling according to a specified rule.

When there is moving across the control plane gateways, between the control plane gateways, the method further comprises: migrating context configuration information related to the corresponding UE or an air interface connection.

said processing the user plane data of the access UE via the set up user plane link comprises:

through the set up user plane link, the user plane gateway processing the user plane data, aggregating data from different radio access network nodes and sending them to the core network, or distributing data from the core network to different radio access network nodes.

The aggregating or distributing comprises:

managing data channels between the core network and the user plane gateway, as well as between the user plane gateway and the radio access network;

maintaining a mapping relationship of data channels between the core network and the user plane gateway as well as between the user plane gateway and the radio access network nodes; and forwarding data in accordance with the mapping relationship, and managing the mapping relationship.

The mapping relationship is a one-to-one mapping relationship; or the mapping relationship is a one-to-many mapping relationship, at this time, the user plane gateway maintains the one-to-many relationship in the context information of one UE: in the uplink direction, the user plane gateway aggregates multiple data channels into one data channel to transmit; in the downlink direction, the user plane gateway distributes data according to a preset rule.

When there is moving across the user plane gateways, managing including setting up, deleting and modifying the data channel between the user plane gateways; and, maintaining the data channel mapping relationship between the access network nodes or the core network and the user plane gateway, forwarding data according to the mapping relationship, and supporting in managing the mapping relationship.

The embodiment of the present invention provides, including respectively setting up the control plane link and the user plane link, the small cell eNodeB access system to process the control plane data of an access UE via the set up control plane link, and process the user plane data of the access UE via the set up user plane link. In the embodiment of the present invention, it makes the UE have data transmission and reception with two different eNodeBs such as macro cell (eNodeB) and small cell (eNodeB) simultaneously by separating the control plane with the data plane, so as to increase the user throughput and enhance the mobility performance, and to solve the problem that the user switches between the cells so that information exchanges frequently between nodes and so as to cause an impact on the core network, and further to realize the introduction of a large number of small cell eNodeBs at the radio side.

BRIEF DESCRIPTION OF THE DRAWINGS

FIG. 2(a)~FIG. 2(d) are schematic diagrams of protocol architectures of a control plane and a user plane in the LTE architecture in the related art;

FIG. 3(a)~FIG. 3(c) are respectively schematic diagrams of existing S1 interface, X2 interface and E-RAB setup processes;

FIG. 4 is a flow chart of a method for a small cell eNodeB access system achieving network access in accordance with an embodiment of the present invention;

PREFERRED EMBODIMENTS OF THE INVENTION

Figure 1:
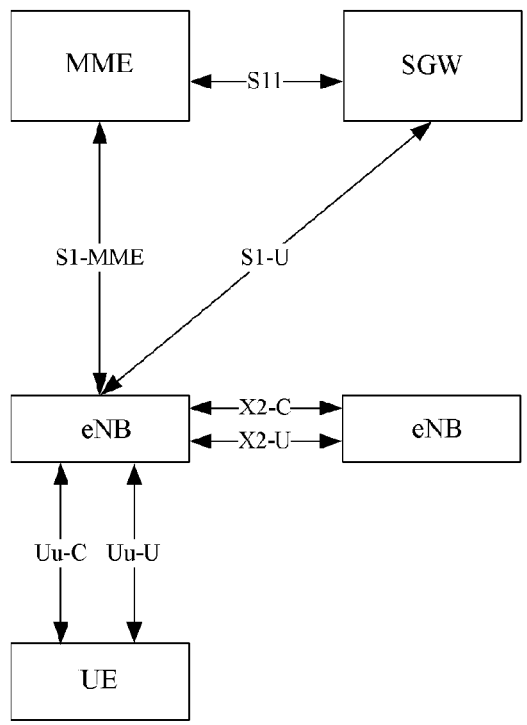
FIG. 1 is a schematic diagram of a LTE overall architecture in the related art.
Figure 2A:
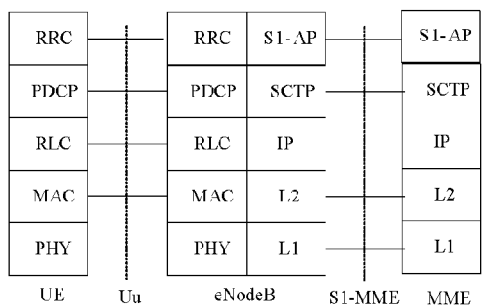
Figure 2B:
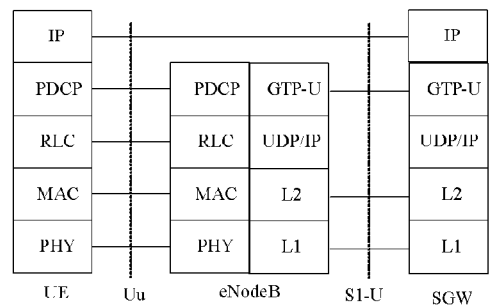

FIG. 4 is a flow chart of a method for a small cell eNodeB access system achieving network access in accordance with an embodiment of the present invention, and as shown in FIG. 4, it comprises the following steps:

step 400: a small cell eNodeB access system respectively sets up a control plane link and a user plane link.

In the small cell eNodeB access system according to the embodiment of the present invention, a control plane gateway is newly provided for connecting the radio access network and the core network, and a link set up via the control plane gateway between the core network and the radio access network is the control plane link. Via the control plane gateway, a large number of radio access network nodes connect to the core network, meanwhile, the control plane gateway works as an aggregation and distribution node of control plane signaling, aggregating signalings from different radio access network nodes and sending them to the core network, or distributing signalings from the core network to different radio access network nodes. Meanwhile, the control plane gateway works as a management network element of radio access network node, coordinating and managing one or more radio access network nodes. Take the LTE network architecture for example, the control plane gateway connects to one or more MMEs via the S1-MME1 interface, and connects to one or more eNBs via the S1-MME2 interface.

In the small cell eNodeB access system according to the embodiment of the present invention, a user plane gateway is newly provided for connecting the radio access network and the core network, and a link set up via the user plane gateway between the core network and the wireless access network is the user plane link. Through the user plane gateway, a large number of radio access network nodes connect to the core network, meanwhile, the user plane gateway works as an aggregation and distribution node of user plane data, aggregating data from different radio access network nodes and sending them to the core network, or distributing data from the core network to different radio access network nodes. Take the LTE network architecture for example (other system, such as 3G, LTE+, WIFI, can also use the structure in the embodiment of the present invention), the user plane gateway connects to one or more SGWs via the S1-U1 interface and connects to one or more eNBs via the S1-U2 interface.

The method according to the embodiment of the present invention further comprises: setting up the S11 interface which connects between the MME and the SGW and it is set to control and manage the SGW for the MME, and it is the interface in the related art;

wherein, the S1-MME1 interface is connected between the control plane gateway and the MME, and it may be an existing S1-MME interface.

The S1-MME2 interface is connected between the control plane gateway and the eNodeB, and it can be an existing S1-MME interface, or it can be added with access network feedback information on its basis for a better distribution decision.

The S1-U1 interface is connected between the user plane gateway and the SGW, and it is set to transmit data. For example, it can be an existing S1-U interface and use the protocol stack IP/UDP/GTP-U.

The S1-U2 interface is connected between the user plane gateway and the eNodeB, and it is set to transmit data. For example, it can be similar to the existing S1-U interface and use the protocol stack IP/UDP/GTP-U.

Furthermore, the method according to the embodiment of the present invention further comprises: a small cell eNodeB access system setting up a connection link between the control plane gateway and the user plane gateway. Through the connection link, the control plane gateway implementing the control and management of the user plane gateway, specifically including: controlling a channel between the user plane gateway and the core network, as well as the set-up, deletion and modification of connections between the user plane gateway and the radio access network node. Wherein the modification comprises the modification of attributes and modification of forwarding relationships.

The control plane gateway can control one or more user plane gateways, and the user plane gateway can be connected to one or more control plane gateways, which is conducive to the system expansion and load sharing.

Furthermore, the method according to the embodiment of the present invention further comprises: a small cell eNodeB access system setting up a connection link between the user plane gateways, and via the connection link, it achieves transmitting data between nodes when the UE moves across the user plane gateways; meanwhile, the control plane gateway can also achieve the inter-node negotiation via that connection link when the UE moves across the control plane gateways.

Step 401: the small cell eNodeB access system processes the control plane data of the access UE via the set up control plane link, and processes the user plane data of the access UE via the set up user plane link.

On the one hand, in this step, via the set up control plane link, the control plane gateway processes the control plane data, aggregates signalings from different radio access network nodes and sends them to the core network, or it distributes signalings from the core network to different radio access network nodes. It specifically comprises: managing, including setting up, deleting and modifying, signaling connections between the core network and the control plane gateway, as well as between the control plane gateway and the radio access network nodes;

maintaining the UE-related context information, including the mapping relationship of signaling connections between the core network and the control plane gateway, as well as between the control plane gateway and the radio access network nodes; when the UE supports multiple streams, that is, the UE has data transmission and reception with both the macro cell (eNodeB) and the small cell (eNodeB) simultaneously, in the following the macro cell or the small cell or the eNB is taken as representative to describe different eNodeBs, and one UE can store signaling connections between the control plane gateway and multiple radio access network nodes.

The signaling connections are managed according to the signalings of the core network or the radio access network nodes. Furthermore, when setting up a connection link between the control plane gateway and the user plane gateway, it further comprises instructing the user plane gateway via the X-1 interface to manage the corresponding data connection, that is, the management is performed through the user plane link of the user plane gateway.

Furthermore, if the signaling received from the core network or the radio access network nodes indicates that when it does not need to modify the connection between the control plane gateway or the user plane gateway and the core network, the signaling is terminated at the control plane gateway.

When the mapping relationship is a one-to-one mapping relationship, the signaling is forwarded according to the mapping relationship; when the mapping relationship is a one-to-many relationship mapping, the signaling is forwarded by proxy according to the specified rule. Wherein, the specified rule can be preset or configured. The specified rule can be a one-to-many mapping relationship of the core network and multiple radio access network nodes through the control plane gateway.

When there is moving across the control plane gateways, between the control plane gateways, it further comprises migrating context configuration information related to the corresponding UE or air interface connection. In particular, when the S1-MME1 interface and the S1-MME2 interface use the same protocol stack, the control plane gateway is a radio access network node for the core network, while it is a core network for the radio access network node.

On the other hand, in this step, via the set up user plane link, the user plane gateway processes the user plane data, and aggregates data from different radio access network nodes and sends them to the core network, or distributes data from the core network to different radio access network nodes. It specifically comprises: managing, including setting up, deleting, modifying the data channel between the core network and the user plane gateway as well as between the user plane gateway and the radio access network; maintaining the mapping relationship of data channels between the core network and the user plane gateway, as well as the user plane gateway and the radio access network nodes; forwarding data in accordance with the mapping relationship, and managing, including setting up, deleting, and modifying the mapping relationship.

The mapping relationship can be a one-to-one mapping relationship, and it can also be a one-to-many mapping relationship. When it is a one-to-many mapping relationship, a plurality of data channels belong to one UE, and if the UE is connected with different eNodeBs, at this time, the user plane gateway maintains the one-to-many relationship in the context information of one UE: in the uplink direction, the user plane gateway aggregates a plurality of data channels into one data channel to transmit; in the downlink direction, the user plane gateway distributes data according to the preset rule such as the distribution algorithm, for example the data is distributed according to the load.

When there is moving across the user plane gateways, a data channel between the user plane gateways is managed, including setting up, deleting and modifying, maintaining the data channel mapping relationship between the access network node and the user plane gateway, as well as the data channel mapping relationship between the core network and the user plane gateway, and the data is forwarded according to the mapping relationship, supporting in managing, including setting up, deleting and modifying, the mapping relationship. Particularly, when the S1-U1 interface and the S1-U2 interface use the same protocol stack, the user plane gateway is the radio access network node for the core network, and it is the core network for the radio access network node.

The user plane gateway and the control plane gateway in the embodiment of the present invention are logical function nodes, and they can be deployed respectively into independent physical nodes or set in the original physical node according to the actual situation. In the following, in combination of the specific composition of the small cell eNodeB access system in the embodiment of the present invention, the method for it achieving the network access will be described in detail.

Figure 5:
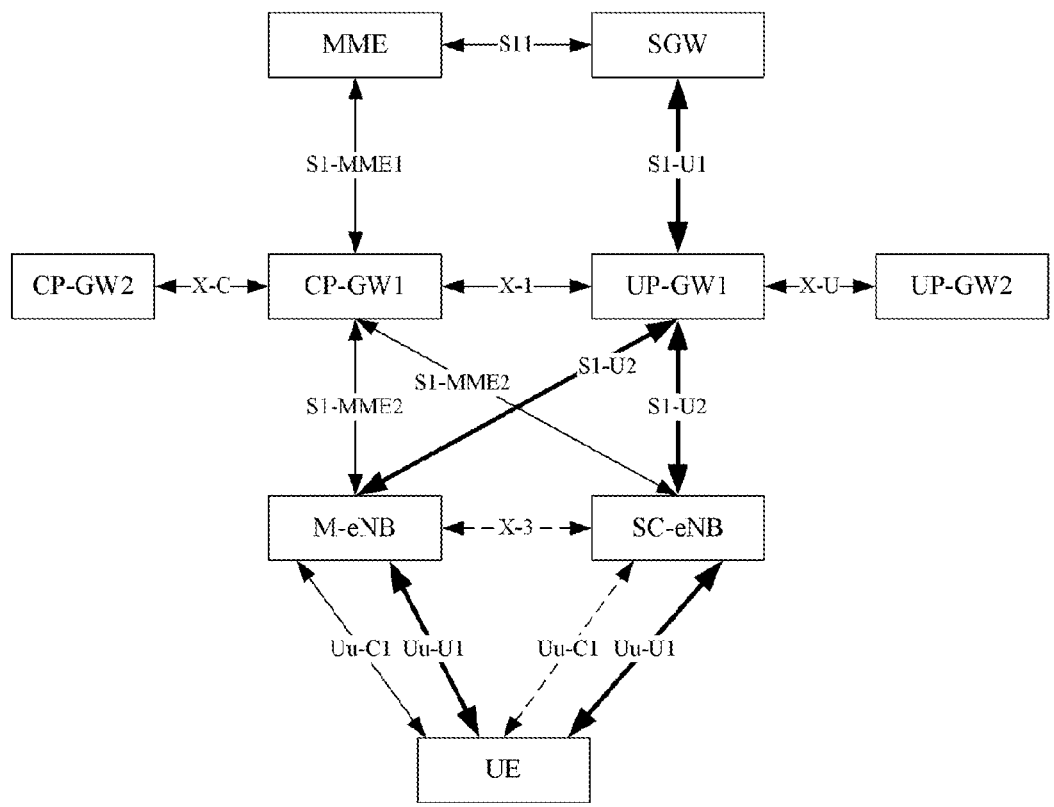
FIG. 5 is a schematic diagram of a logic function structure of a first embodiment of the small cell eNodeB access system in accordance with an embodiment of the present invention.

FIG. 5 is a structural schematic diagram of the logic function of the first embodiment of the small cell eNodeB access system in accordance with an embodiment of the present invention, as shown in FIG. 5, the UP-GW and the CP-GW are independent physical nodes respectively, and at this time, the functions of respective network nodes are as follows:

the MME is connected to the control plane gateway via the S1-MME1 interface, and connected to the SGW via the S11 interface. In addition to existing functions of the MME in the LTE system Release11, it is further set to support managing (including setting up, deleting and modifying) the control plane link with the control plane gateway.

The SGW is connected to the user plane gateway via the S1-U1 interface. In addition to existing functions of the SGW in the LTE system Release11, it is further set to support managing the S1-U1 interface connection with the user plane gateway, and the function is similar to the function of the GTP-U channel between the SGW and the eNodeB in the Release11, that is, the function of S1-U interface.

The control plane gateway is connected to the MME via the S1-MME1 interface, connected to the macro eNodeB or the small cell eNodeB via the S1-MM2 interface, connected to the user plane gateway via the X-1 interface, connected to other control plane gateways via the X-C interface, and it is set for the inter-node negotiation when moving across the control plane gateways; and it is set to support the function of managing (including setting up, deleting and modifying) the control plane link with the MME, as well as managing the control plane link with the eNodeB; it is also set to manage related GTP-U channels, and the related GTP-U channels comprise the S1-U1 interface connection set up between the user plane gateway and the SGW, as well as the S1-U2 interface connection set up between the user plane gateway and the eNodeB;

when a certain E-RAB of a certain UE moves between the small cell eNodeBs, the control plane gateway can make the E-RAB of UE move between the small cells through the method of remaining the control plane link from the control plane gateway to the MME, that is, the control plane link between the control plane gateway and the MME does not need to be changed. Therefore, it avoids the effect of the UE moving between the small cell eNodeBs on the MME;

the control plane gateway is transparent to the macro cell. The control plane gateway may have access control functions.

The user plane gateway is connected to the SGW via the S1-U1 interface, connected to the macro eNodeB or the small cell eNodeB via the S1-U2 interface, connected to the control plane gateway via the X-1 interface, and connected to other user plane eNodeBs via the X-U interface, and it is set to transmit data between the nodes when moving across the user plane gateways. It is set to, under the control of the control plane gateway, support managing the S1-U1 interface connection with the SGW, as well as managing the S1-U2 interface with the eNodeB;

when a certain E-RAB of a certain UE transfers between the small cell eNodeBs, the user plane gateway avoids the effect of the UE transferring between the small cell eNodeBs on the SGW through the method of remaining the GTP-U channel from the user plane gateway to the SGW;

the user plane gateway is transparent to the macro cell.

The macrocell is connected to the control plane gateway via the S1-MME2 interface, connected to the user plane gateway via the S1-U2 interface, connected to the UE via the Uu interface, and connected to the small cell eNodeB via the X-3 interface. In addition to having the functions of the eNodeB of the LTE system Release11, it is further set to support managing the control plane link with the control plane gateway, and managing the S1-U1 interface connection with the user plane gateway. The macro cell performs the mobility management.

The small cell is connected to the user plane gateway via the S1-U2 interface, connected to the control plane gateway via the S1-MME2 interface, connected to the UE via the Uu interface, and connected to the macro eNodeB via the X-3 interface. In addition to having all of the functions of supporting setting up the LTE system data radio bearer (DRB) with the UE and communicating on the DRB, it is also set to support managing the control plane link with the control plane gateway, and managing the S1-U2 interface connection with the user plane gateway.

In the first embodiment shown in FIG. 5, the protocol stack of Uu interface in the preferred embodiment of the present invention is the same as that in the related art; the protocol stacks and setup processes of the S1-MME1 interface and the S1-MME2 interface in the preferred embodiment of the present invention are the same as those of the S1-MME interface in the related art; the protocol stacks and the setup processes of the S1-U1 interface and the S1-U2 interface in the preferred embodiment of the present invention are the same as those of the S1-U interface in the related art; the protocol stack and the setup process of the X-1 interface in the preferred embodiment of the present invention are the same as those of the S1-C interface in the related art.

In the first embodiment shown in FIG. 5, processing the control plane data according to the control plane link comprises: in the uplink direction: a UE sending data to one or more eNodeBs via one or more radio interfaces, one or more eNodeBs sending data to the control plane gateway via the S1-MME2 interface, the control plane gateway sending data to the MME via the S1-MME1 interface, at this time the control plane gateway completing the aggregation of signalings from different radio access network nodes and sending them to the core network; in the downlink direction: the MME transmits data via the S1-MME1 interface to the control plane gateway, the control plane gateway sending data to one or more eNodeBs via the S1-MME2 interface, the eNodeB sending data to the UE via the radio interface, at this time, the control plane gateway distributing the signalings from the core network to different radio access network nodes. Wherein, the control plane link from the UE to the small cell eNodeB may exist or may not exist, and if not, the control plane data between the UE and the small cell eNodeB are forwarded via the macro eNodeB (ie, X-3 interface).

Processing the user plane data according to the user plane link comprises: in the uplink direction: the UE sending data to one or more eNodeBs via one or more radio interfaces, one or more eNodeBs sending data to the user plane gateway via the S1-U2 interface, the user plane gateway sending data to the SGW via the S1-U1 interface, at this time, the user plane gateway working as the aggregation and distribution node of user plane data, aggregating data from different radio access network nodes and sending them to the core network; in the downlink direction: the SGW sending data to the user plane gateway via the S1-U1 interface, the user plane gateway sending data to one or more eNodeBs via the S1-U2 interface, the eNodeB sending data to the UE via the radio interface, at this time, the user plane gateway working as the aggregation and distribution node of user plane data, distributing data from the core network to different radio access network nodes.

Figure 6:
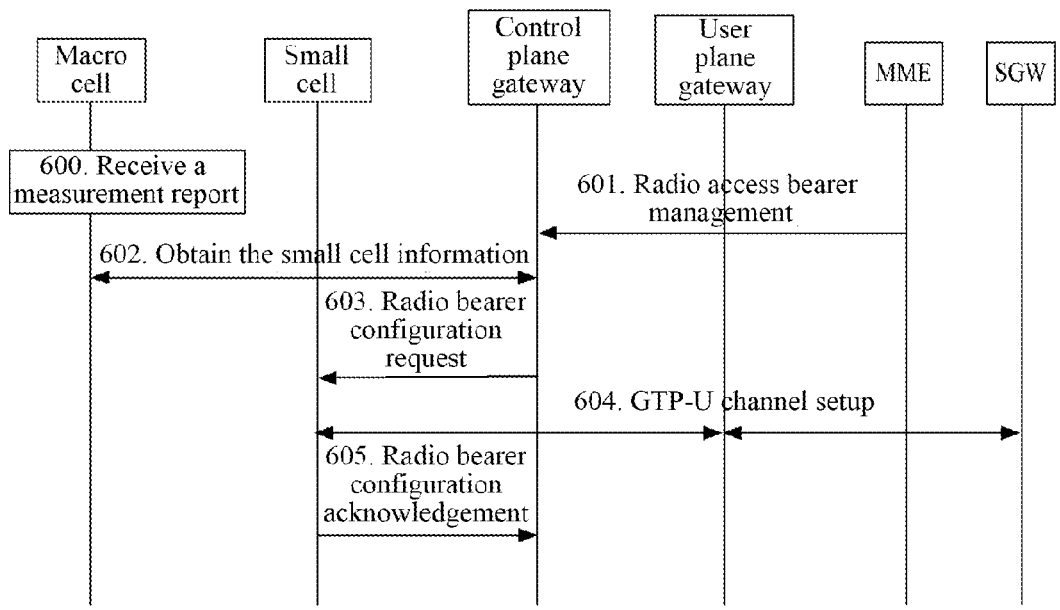
FIG. 6 is a schematic diagram of a GTP-U channel setup process in the first embodiment of the small cell eNodeB access system in accordance with an embodiment of the present invention.

FIG. 6 is a schematic diagram of the GTP-U channel setup process of the first embodiment of the small cell eNodeB access system in accordance with the embodiment of the present invention, at this time, the control plane gateway CP-GW is responsible for the GTP-U channel management, and as shown in FIG. 6, assuming that the UE and the macro eNodeB have set up an air interface link, the macro eNodeB has configured the UE with a measurement task, and the UE has reported a measurement result to the macro eNodeB, comprising:

step 600~step 601: the macro eNodeB (macro cell) receives a measurement report. The MME sends a radio access bearer management message to the control plane gateway via the S1-MME interface. The radio access bearer management message comprises at least: the transport layer address TNL address-CN of the GTP-U channel corresponding to a certain evolved radio access bearer (E-RAB) in the core network, the virtual connection identification GTP-TEID-CN of the GTP-U channel, as well as the E-RAB related information.

Step 602: the control plane gateway negotiates with the macro eNodeB, and the macro eNodeB returns the related information of small cell eNodeB (small cell), such as the cell identification and measurement result, of the small cell eNodeB to the control plane gateway.

Step 603: the control plane gateway sends a radio bearer configuration request message for requesting to set up a GTP-U channel to the cell eNodeB. The radio bearer configuration request message comprises at least: the TNL address-CN, the GTP-TEID-CN, as well as the E-RAB related information.

step 604: it is to set up GTP-U channels between the small cell eNodeB and the user plane gateway, as well as between the user plane gateway and the SGW.

Figure 7:
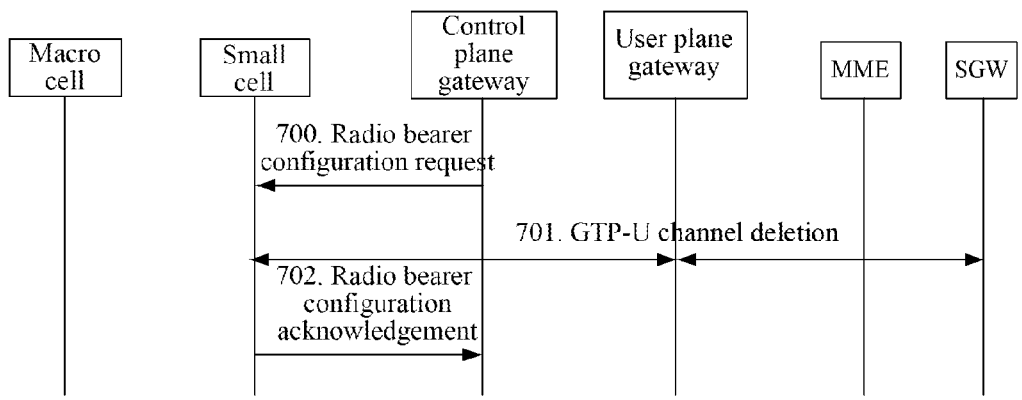
FIG. 7 is a schematic diagram of a GTP-U channel deletion process of the first embodiment of the small cell eNodeB access system in accordance with an embodiment of the present invention.

Step 605: the small cell eNodeB sends a radio bearer configuration acknowledgment message to the control plane gateway to confirm that the GTP-U channel to the core network is set up. The radio bearer configuration acknowledgment message at least comprises: the transport layer address TNL address-SGW-SC of the GTP-U channel corresponding to the current E-RAB in the small cell, the virtual connection identification GTP-TEID-SGW-SC of the GTP-U channel, and the E-RAB related information, FIG. 7 is a schematic diagram of the GTP-U channel deletion process of the first embodiment of the small cell eNodeB access system in accordance with an embodiment of the present invention, as shown in FIG. 7, it comprises:

step 700: the control plane gateway sends the small cell a radio bearer configuration request for requesting to delete the GTP-U channel, and the message comprises at least the information of the E-RAB corresponding to the GTP-U channel required to be deleted.

Step 701: the small cell and the user plane gateway respectively delete the GTP-U channel between the small cell and the user plane gateway, and the user plane gateway and the SGW respectively delete the GTP-U channel between the user plane gateway and the SGW.

Step 702: the small cell sends the control plane gateway a radio bearer configuration acknowledgement for indicating that the GTP-U channel has been deleted.

Figure 8:
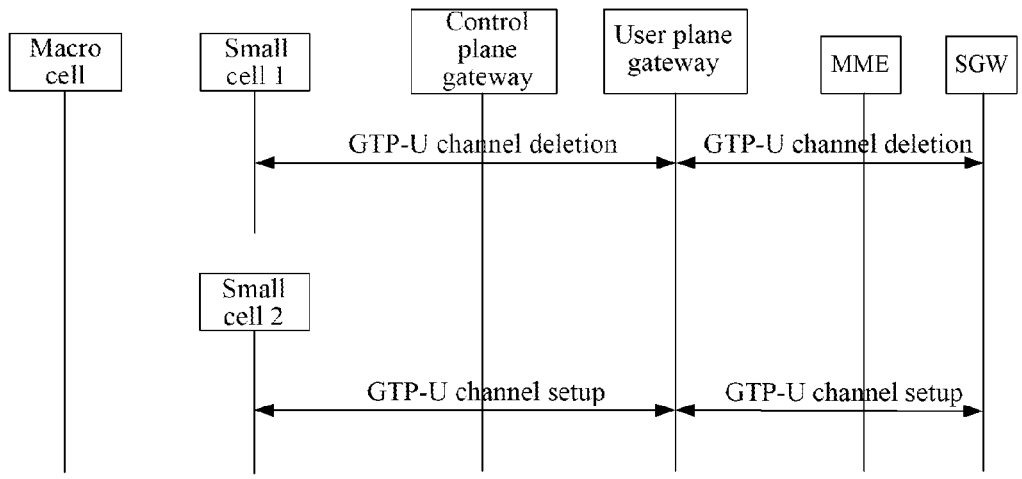
FIG. 8 is a schematic diagram of a GTP-U channel replacement process of the first embodiment of the small cell eNodeB access system in accordance with an embodiment of the present invention.

FIG. 8 is a schematic diagram of the GTP-U channel replacement process of the first embodiment of the small cell eNodeB channel access system in accordance with the embodiment of the present invention, assuming that the UE moves from the small cell 1 to the small cell 2, as shown in FIG. 8, it comprises:

the control plane gateway selecting and setting up a GTP-U channel from the small cell 2 to the SGW in accordance with the process shown in FIG. 6, and the GTP-U channel is composed of two GTP-U channels between the SGW and the user plane gateway as well as between the user plane gateway and the small cell 2;

in accordance with the process shown in FIG. 7, the GTP-U channel in the small cell 1 is deleted.

When the UE shown in FIG. 8 of the embodiment of the present invention moves between the small cells, the management of GTP-U channel does not affect the core network, so that the introduction of a large number of small cells at the radio side becomes possible.

Figure 9:
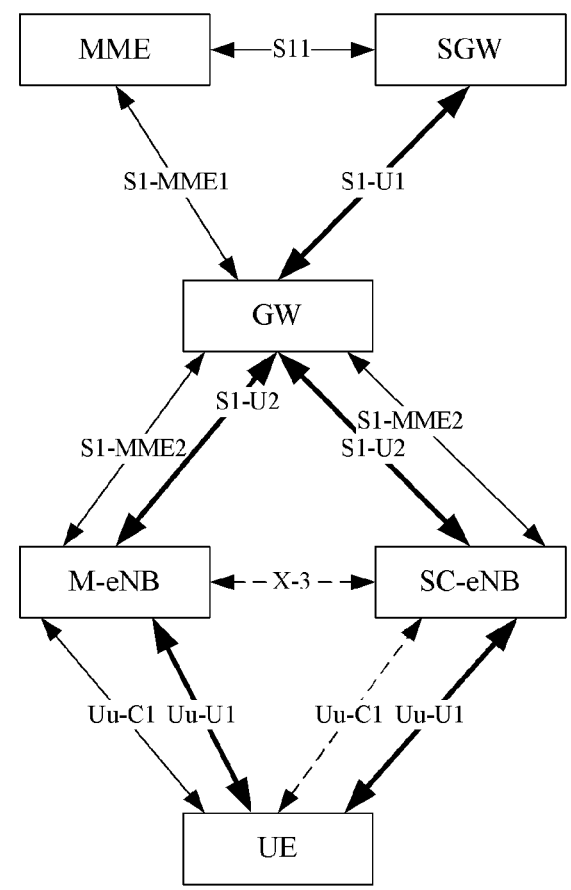
FIG. 9 is a schematic diagram of the logic function structure of a second embodiment of the small cell eNodeB access system in accordance with an embodiment of the present invention.

FIG. 9 is a schematic diagram of the logic function structure of the second embodiment of the small cell eNodeB access system in accordance with an embodiment of the present invention, and as shown in FIG. 9, in the logic function structure of the small cell eNodeB in the second embodiment, the implementation of various network nodes, compared to that in the first embodiment, the difference is that the control plane gateway and the user plane gateway are co-located in the same physical entity, and the X-1 interface between the two parties is an internal interface of the gateway, and the communication between the CP-GW and the UP-GW is implemented within the GW. For the logical function structure of the small cell eNodeB access system shown in FIG. 9, its network access method is consistent to the one in the first embodiment and is not repeated here. The specific implementations of the GTP-U channel setup, deletion and replacement are consistent to those in the first embodiment and are not repeated here.

Figure 10:
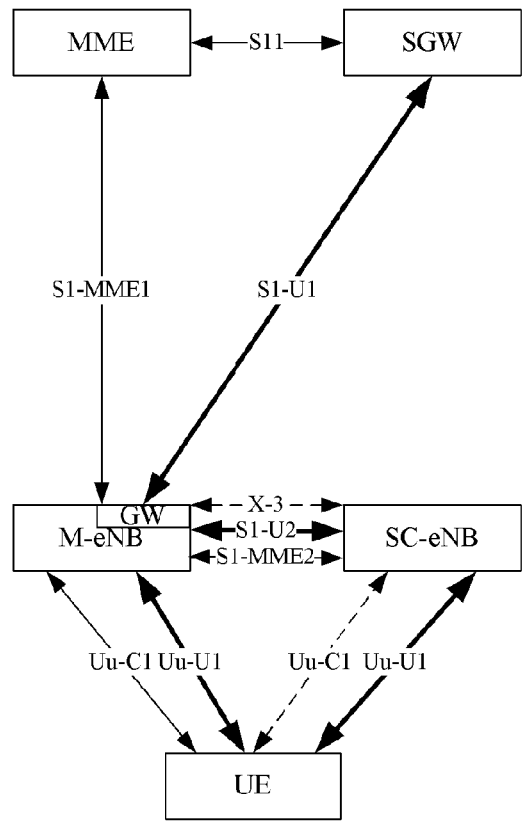
FIG. 10 is a schematic diagram of the logic function structure of a third embodiment of the small cell eNodeB access system in accordance with an embodiment of the present invention.

FIG. 10 is a schematic diagram of the logic function structure of the third embodiment of the small cell eNodeB access system in accordance with the embodiment of the present invention, as shown in FIG. 10, the control plane gateway and the user plane gateway are co-located and set in the macro eNodeB, in this case, the S1-MME1 interface is an interface between the MME and the M-eNB, the S1-U1 interface is an interface between the SGW and the M-eNB, and the S1-MME2 and S1-U2 are interfaces between the M-eNB and the S-eNB. The function of various network nodes are respectively:

the implementations of the MME and the SGW are consistent with those in the first embodiment shown in FIG. 5 and are not repeated here.

The functions of the control plane gateway and the user plane gateway are consistent with those in the first embodiment shown in FIG. 5, and the only difference is that, the interface between the control plane gateway and the user plane gateway is an internal interface.

The macro cell is connected to the MME via the S1-MME1 interface, and it has the S1-U2 interface, the S1-MME2 interface and the X-3 interface with the small cell eNodeB, and it is connected to the UE via the Uu interface. In addition to having the functions of the eNodeB in the LTE system Release11, it is further set to support managing the control plane link with the small eNodeB, similar to the function of managing the control plane link between the MME and the eNodeB in Release11, namely the function of S1-MME interface; and to support managing the S1-U2 interface connection with the small eNodeB, similar to the function of the MME controlling the SGW to manage the related GTP-U channel in the Release11, that is, the function of S1-U interface.

When a certain E-RAB of a certain UE transfers between the small cells, the macro eNodeB avoids the effect of such moving on the MME and the SGW through the method of remaining the control plane link between the macro eNodeB to the MME, as well as the GTP-U channel between the macro eNodeB and the SGW. The macro cell is further set to perform the access control and mobility management.

The small cell has the S1-U2 interface, the S1-MME2 interface, and the X-3 interface with the macrocell eNodeB, and it is connected to the UE via the Uu interface. In addition to supporting all the functions of setting up a data radio bearer (DRB) of LTE system between it and the UE and communicating on the DRB, it is further set to support managing the control plane link and the GTP-U channel with the macro eNodeB.

In the third embodiment shown in FIG. 10, the protocol stack of Uu interface in the preferred embodiment of the present invention is the same as that in the related art; the protocol stacks and setup processes of the S1-MME1 interface and the S1-MME2 interface in the preferred embodiment of the present invention are the same as those of the S1-MME interface in the related art; the protocol stacks and the setup processes of the S1-U1 interface and the S1-U2 interface in the preferred embodiment of the present invention are the same as those of the S1-U interface in the related art.

In the third embodiment shown in FIG. 10, processing the control plane data according to the control plane link comprises: in the uplink direction: a UE sending data to one or more eNodeBs via one or more radio interfaces, for the small eNodeBs, then sending data to the macro eNodeB via the S1-MME2 interface, the macro eNodeB sending data to the MME via the S1-MME1 interface; in the downlink direction: the MME sending data via the S1-MME1 interface to the macro eNodeB, the macro eNodeB sending data to the small eNodeB via the S1-MME2 interface or to the UE via the radio interface, and the small eNodeB sending data to the UE via the radio interface. Wherein the control plane link between the UE and the small eNodeB may exist or may not exist, and if not, the control plane between the UE and the small eNodeB need to be forwarded via the macro eNodeB (ie, X-3 interface).

Processing the user plane data according to the user plane link comprises: in the uplink direction: the UE sending data to one or more eNodeBs via one or more radio interfaces, the small eNodeB needing to send data to the macro eNodeB via the S1-U2 interface, the macro eNodeB sending data to the SGW via the S1-U1 interface; in the downlink direction: the SGW sending data to the macro eNodeB via the S1-U1 interface, the macro eNodeB sending data to the small cell via the S1-U2 interface or to the UE via the radio interface, the small eNodeB sending data to the UE via the radio interface.

Figure 11:
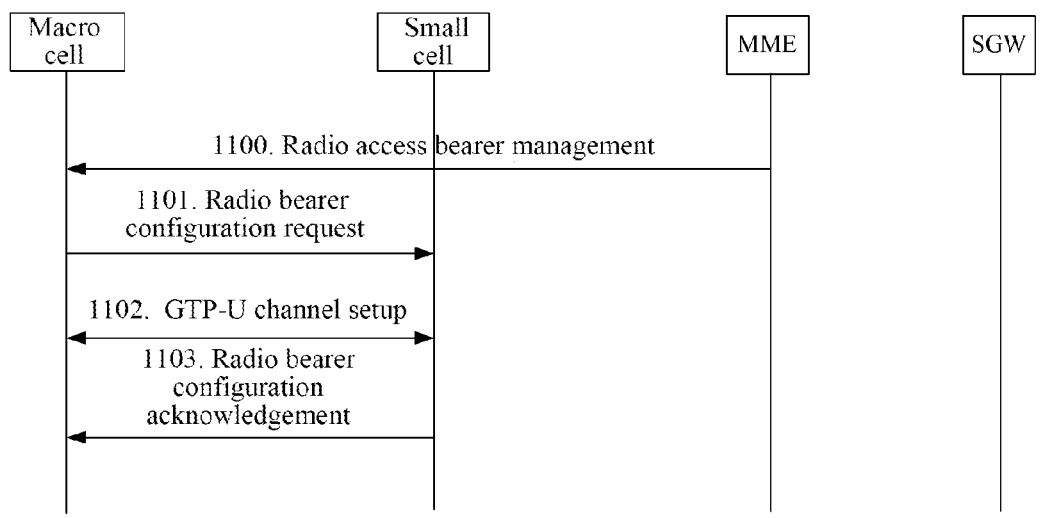
FIG. 11 is a schematic diagram of the GTP-U channel setup process of a third embodiment of the small cell eNodeB access system in accordance with an embodiment of the present.

FIG. 11 is a schematic diagram of the GTP-U channel setup process of the third embodiment of the small cell eNodeB access system in accordance with an embodiment of the present invention, as shown in FIG. 11, it comprises:

step 1100: the MME sends a radio access bearer management message to the macro cell via the S1-MME1 interface.

Step 1101: the macro cell sends the small cell a radio bearer configuration request message for requesting to set up a GTP-U channel.

Step 1102: it is to set up the GTP-U channel between the macro cell and the small cell.

Step 1103: the small cell sends the macro cell a radio bearer configuration acknowledgment message to confirm that the GTP-U channel from itself to the macro cell is set up.

Figure 12:
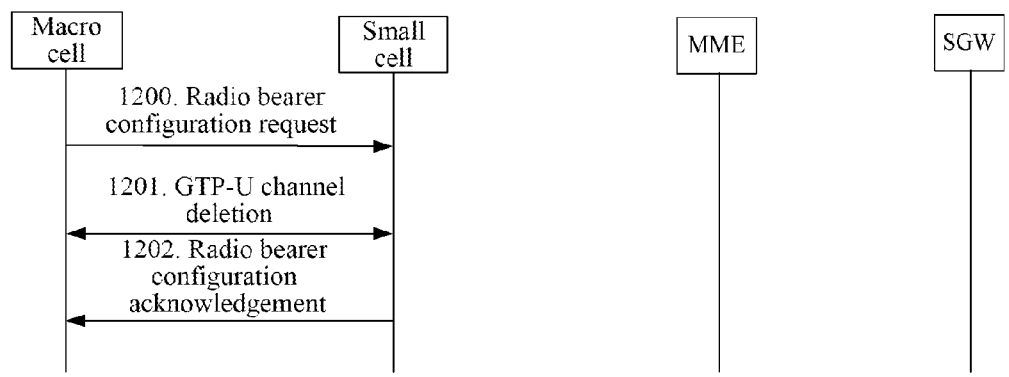
FIG. 12 is a schematic diagram of the GTP-U channel deletion process of the third embodiment of the small cell eNodeB access system in accordance with an embodiment of the present invention.

FIG. 12 is a schematic diagram of the GTP-U channel deletion process of the third embodiment of the small cell eNodeB access system of the present invention, as shown in FIG. 12, it comprises:

step 1200: the macro cell sends the small cell a radio bearer configuration request for requesting to delete the GTP-U channel.

Step 1201: it is to delete the GTP-U channel between the small cell and the macro cell.

Step 1202: the small cell sends a GTP-U channel deletion acknowledgement message to the macro cell.

Figure 13:
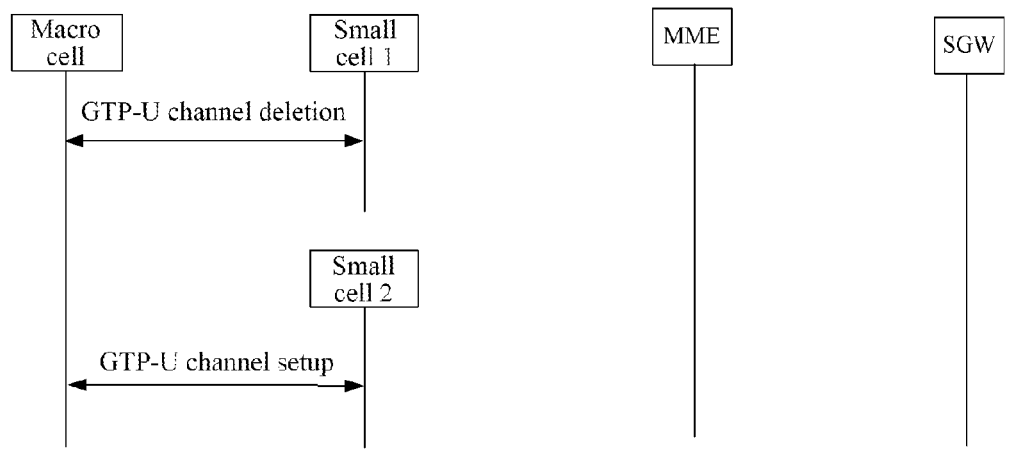
FIG. 13 is a schematic diagram of the GTP-U channel replacement process of the third embodiment of the small cell eNodeB access system in accordance with an embodiment of the present invention.

FIG. 13 is a schematic diagram of the GTP-U channel replacement process of the third embodiment of the small cell eNodeB access system in accordance with the embodiment of the present invention, assuming that the UE moves from the small cell 1 to the small cell 2, as shown in FIG. 13, it comprises:

when the UE moves from the small cell 1 to the small cell 2, the macro cell executes the process shown in FIG. 11 and sets up the GTP-U channel from the small cell 2 to the macro cell, and deletes the GTP-U channel in the small cell 1 in accordance with the process shown in FIG. 12.

When the UE shown in FIG. 13 in the embodiment of the present invention moves between the small cells, the management of GTP-U channel does not affect the core network, so that the introduction of a large number of small cells at the radio side becomes possible.

Figure 14:
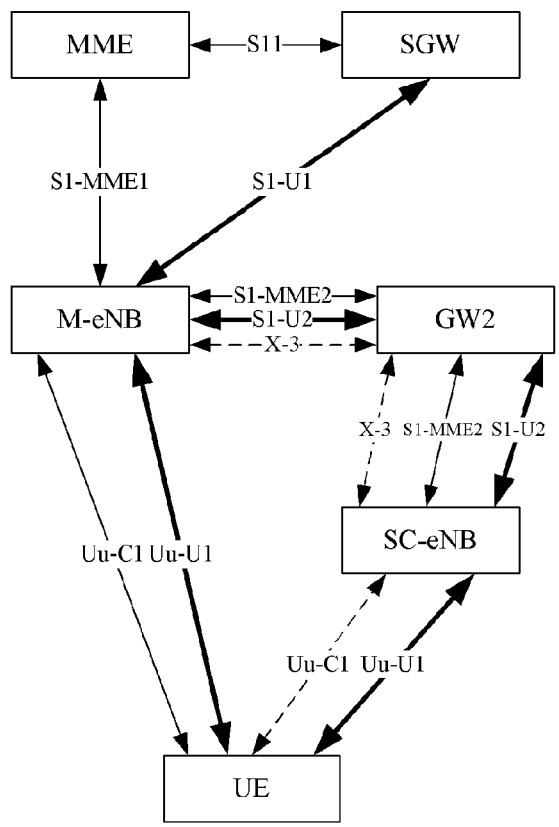
FIG. 14 is a schematic diagram of the logic function structure of a fourth embodiment of the small cell eNodeB access system in accordance with an embodiment of the present invention.

FIG. 14 is a schematic diagram of the logic function structure of the fourth embodiment of the small cell eNodeB access system in accordance with the embodiment of the present invention, as shown in FIG. 14, in the fourth embodiment, a gateway (GW2) is set between the macro eNodeB and the small cell eNodeB, and the GW2 is responsible for managing the control plane and the user plane of the small cell, compared with the structure of the third embodiment shown in FIG. 10, the difference is: the X-3 interface, the S1-MME2 interface (or the X-1 interface and the S1-MME2 interface together are called S1-MME2+ interface), as well as the S1-U2 interface is the interface between the GW2 and the small cell eNodeB and also the interface between the GW2 and the macro eNodeB. The functions of respective network nodes are respectively:

the implementations of MME and SGW are consistent with those in the first embodiment shown in FIG. 5 and are not repeated here.

The macro cell is connected to the MME via the S1-MME1 interface, and sets up the S1-U2 interface and S1-MME2 interface (further including the X-3 interface) connections to the small cell eNodeB via the gateway GW2, and it is connected to the UE via the Uu interface. In addition to the functions of the eNodeB in the LTE system Release11, it is further set to support the function of managing the control plane link with the gateway GW2. The macro cell is set to perform the access control and mobility management.

The gateway GW2 supports the function of managing the control plane link and the user plane link with the eNodeB, similar to the function of managing the control plane link between the MME and the eNodeB in the Release 11, that is, the function of S1-MME interface, as well as the function of the SGW and the eNodeB managing the user plane link, that is, the function of S1-U interface in the Release 11.

When a certain E-RAB of a certain UE shifts between the small cells under the same gateway, the gateway GW2 can avoid the effect of such moving on the MME and the SGW through the method of remaining the control plane link and the user plane link to the macro eNodeB. The gateway is transparent to the macro cell.

The small cell sets up the S1-U2 interface and S1-MME2 interface (further including the X-3 interface) connections with the macro cell via the gateway GW2, and it is connected to the UE via the Uu interface. It is set to support all the functions of supporting setting up the data radio bearer (DRB) of LTE system with the UE and communicating on the DRB, and it is also set to support managing the control plane link and the S1-U2 interface connections with the gateway.

In the fourth embodiment shown in FIG. 14, the protocol stack of the Uu interface in the preferred embodiment of the present invention is the same as that in the related art; the protocol stacks and setup processes of the S1-MME1 interface and the S1-MME2 interface in the preferred embodiment of the present invention are the same as those of the S1-MME interface in the related art; the protocol stacks and the setup processes of the S1-U1 interface and the S1-U2 interface in the preferred embodiment of the present invention are the same as those of the S1-U interface in the related art.

In the fourth embodiment shown in FIG. 14, processing the control plane data according to the control plane link comprises: in the uplink direction: the UE sending data to one or more eNodeBs via one or more radio interfaces, the small eNodeB sending data to the GW2 via the S1-MME2 interface, the GW2 sending data to the macro eNodeB via the S1-MME2 interface and the macro eNodeB sending data to the MME via the S1-MME1 interface; in the downlink direction: the MME sending data via the S1-MME1 interface to the macro eNodeB, the macro eNodeB sending data to the GW2 via the S1-MME2 interface or sending data to the UE via the radio interface, GW2 sending data to the small eNodeB via the S1-MME2 interface and the small eNodeB sending data to the UE via the radio interface. The control plane link from the UE to the small eNodeB may exist or may not exist, and if not, the control plane between the UE and the small eNodeB is forwarded via the macro eNodeB (ie, X-3 interface).

Processing the user plane data according to the user plane link comprises: in the uplink direction: the UE sending data to one or more eNodeBs via one or more radio interfaces, for the small eNodeB, it also needing to send data to the GW2 via the S1-U2 interface, the GW2 then sending data to the macro eNodeB via the S1-U2 interface, and the macro eNodeB sending the data to the SGW via the S1-U1 interface; in the downlink direction: the SGW sending the data to the macro eNodeB via the S1-U1 interface, the macro eNodeB sending the data to the small eNodeB via the S1-U2 interface or to the UE via the radio interface directly, the small eNodeB sending data to the UE via the radio interface.

Figure 15:
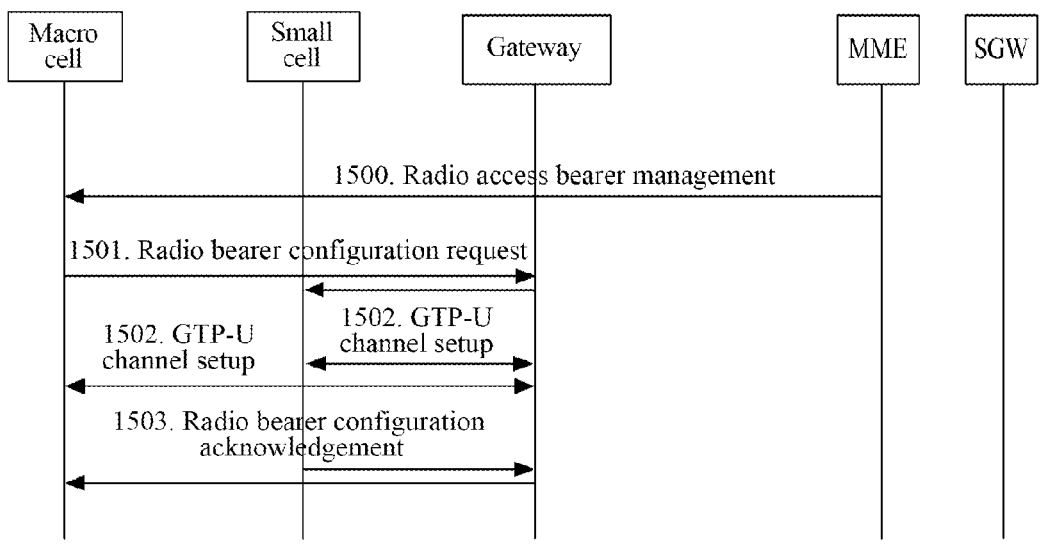
FIG. 15 is a schematic diagram of the GTP-U channel setup process of the fourth embodiment of the small cell eNodeB access system in accordance with an embodiment of the present invention.

FIG. 15 is a schematic diagram of the GTP-U channel setup process of the fourth embodiment of the small cell eNodeB access system in accordance with the embodiment of the present invention, in this embodiment, the gateway is the GW2 shown in FIG. 14, and as shown in FIG. 15, it comprises:

step 1500: the MME sends a radio access bearer management message to the macro cell via the S1-MME interface.

step 1501: the macro cell sends the small cell a radio bearer configuration request message for requesting to set up a GTP-U channel via the gateway.

step 1502: it is to set up the GTP-U channel between the macro cell and the small cell, as well as between the gateway and the macro cell.

Step 1503: the small cell sends a radio bearer configuration acknowledgment message to the macro cell via the gateway.

Figure 16:
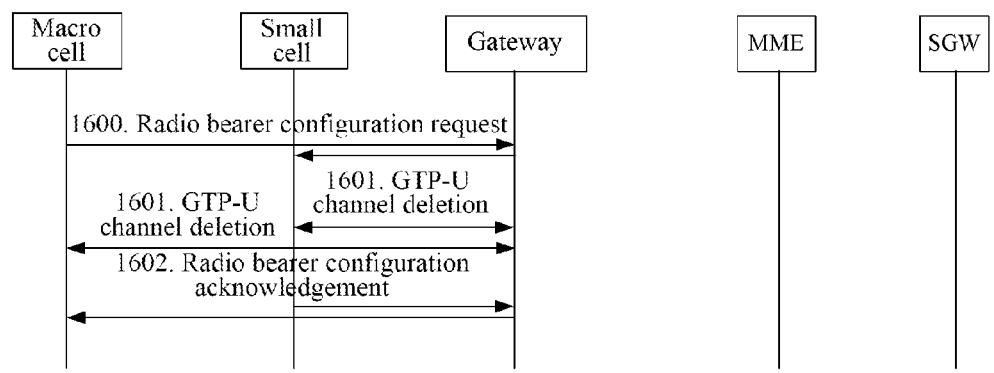
FIG. 16 is a schematic diagram of the GTP-U channel deletion process of the fourth embodiment of the small cell eNodeB access system in accordance with an embodiment of the present invention.

FIG. 16 is a schematic diagram of the GTP-U channel deletion process of the fourth embodiment of the small cell eNodeB access system in accordance with the embodiment of the present invention, as shown in FIG. 16, it comprises:

step 1600: the macro cell sends the small cell a radio bearer configuration request message for requesting to delete the GTP-U channel via the gateway.

Step 1601: it is to delete the GTP-U channels between the small cell and the gateway, as well as between the gateway and the macro cell.

Step 1602: the small cell sends a GTP-U channel deletion acknowledgement message to the macro cell via the gateway.

Figure 17:
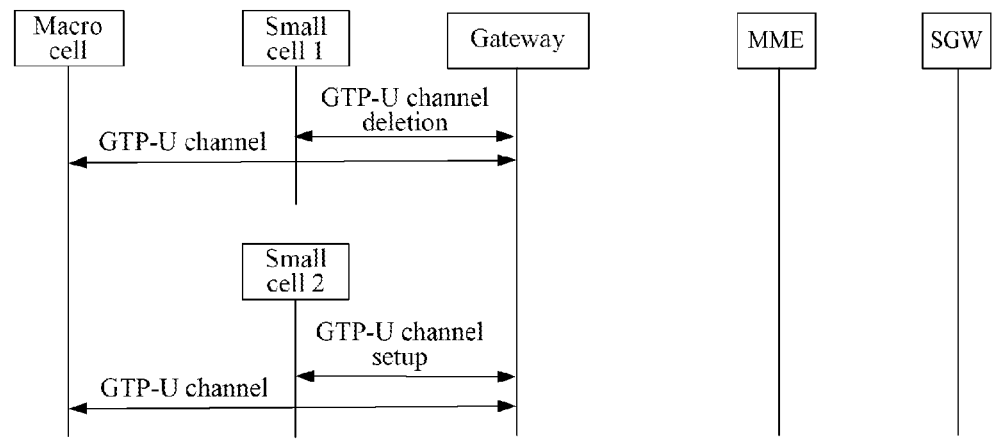
FIG. 17 is a schematic diagram of the GTP-U channel replacement process of the fourth embodiment of the small cell eNodeB access system in accordance with an embodiment of the present invention.

FIG. 17 is a schematic diagram of the GTP-U channel replacement process of the fourth embodiment of the small cell eNodeB access system in accordance with the embodiment of the present invention, assuming that the UE moves from the small cell 1 to the small cell 2, as shown in FIG. 17, it comprises:

when the UE 1 moves from the small cell 1 to the small cell 2, the macro cell refers to the process shown in FIG. 15, however, at this time, it only needs to set up the GTP-U channel from the small cell 2 to the gateway. Moreover, with reference to the process shown in FIG. 16, it deletes the GTP-U channel between the small cell 1 and the gateway.

In the fourth embodiment shown in FIG. 14, the GTP-U channel is composed of two GTP-U channels between the macro cell and the gateway, as well as between the gateway and the small cell 1. When the UE shown in FIG. 17 in the embodiment of the present invention moves between the small cells, the management of GTP-U channel does not affect the core network, so that the introduction of a large number of small cells at the radio side becomes possible.

Figure 18:
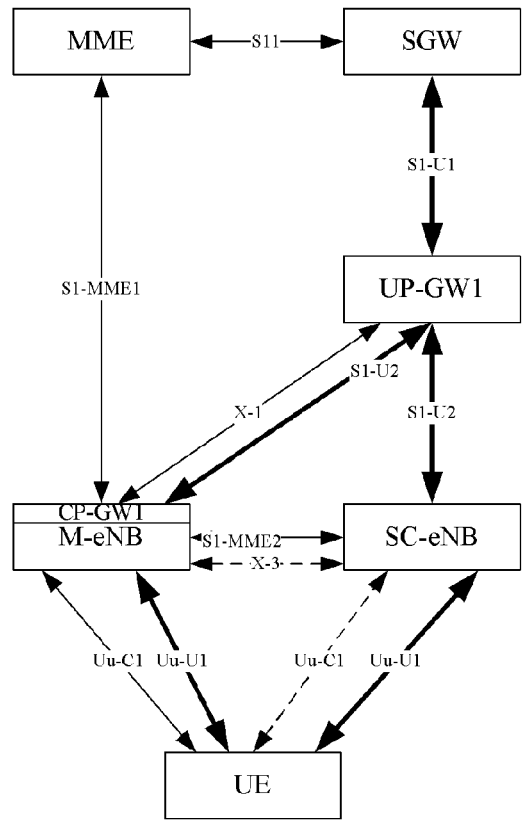
FIG. 18 is a schematic diagram of the logic function structure of a fifth embodiment of the small cell eNodeB access system in accordance with an embodiment of the present invention.

FIG. 18 is a schematic diagram of the logic function structure of the fifth embodiment of the small cell eNodeB access system in accordance with the embodiment of the present invention, as shown in FIG. 18, in the fifth embodiment, the control plane gateway is provided in the macro eNodeB, the user plane gateway is an independent entity, and the functions of respective network nodes are as follows:

the MME is connected to the macro eNodeB via the S1-MME1 interface, and connected to the SGW via the S11 interface. It supports the existing functions of the MME in the LTE system Release11.

The SGW is connected to the user plane gateway via the S1-U1 interface. In addition to existing functions of the SGW of the LTE system Release11, it is further set to support managing the S1-U1 interface connection with the user plane gateway.

The macro cell is provided with the control plane gateway, and it is connected to the MME via the S1-MME1 interface, and connected to the small cell eNodeB via the S1-MM2 interface (further including the X-3 interface), and it has the X-1 interface and the S1-U2 interface with the user plane gateway, and it is connected to the UE via the Uu interface. In addition to having the functions of the eNodeB in the LTE system Release11, it is further set to support managing the S1-U2 interface connection with the user plane gateway, and support the function of managing the control plane link with the small cell eNodeB, similar to the function of managing the control plane link between the MME and the eNodeB in the Release11, that is, the function of S1-MME interface; in addition, it is further set to control the user plane gateway to manage the S1-U2 interface connection, similar to the function of the MME controlling the SGW to manage the related GTP-U channel, that is, the function of S1-U interface in the Release 11, wherein the related GTP-U channel comprises the S1-U1 interface connection between the user plane gateway and the SGW, as well as the S1-U2 interface connection between the user plane gateway and the eNodeB. The macro cell performs the access control and mobility management.

When a certain E-RAB of a certain UE transfers between the small cells, the macro cell avoids the effect of such transfer on the MME through the method of remaining the control plane link from the control plane gateway to the MME.

The user plane gateway is connected to the SGW via the S1-U1 interface, connected to the macro eNodeB via the S1-U2 interface and the X-1 interface, and connected to the small cell eNodeB via the S1-U2 interface, and it is set to support the function of managing the S1-U1 interface connection with the SGW, as well as managing the S1-U2 interface with the eNodeB, similar to the function of managing the GTP-U channel between the SGW and the eNodeB in the Release 11, that is, the function of S1-U interface, these management processes are controlled by the control plane gateway.

When a certain E-RAB of a certain UE transfers between the small cell eNodeBs, the user plane gateway avoids the effect of such movements on the SGW through the method of remaining the GTP-U channel from the user plane gateway to the SGW. The user plane gateway is transparent to the macro cell.

The small cell is connected to the user plane gateway via the S1-U2 interface, connected to the macro eNodeB via the S1-MME2 interface (further including the X-3 interface), and connected to the UE via the Uu interface. It is set to support all the functions of setting up the data radio bearer (DRB) of LTE system with the UE and communicating on the DRB, and it is further set to support managing the control plane link with the control plane gateway, and managing the S1-U2 interface connection with the user plane gateway.

In the fifth embodiment shown in FIG. 18, the protocol stack of the Uu interface in the preferred embodiment of the present invention is the same as that in the related art; the protocol stacks and the setup processes of the S1-MME1 interface and the S1-MME2 interface in the preferred embodiment of the present invention are the same as those of the S1-MME interface in the related art; the protocol stacks and the setup processes of the S1-U1 interface and the S1-U2 interface in the preferred embodiment of the present invention are the same as those of the S1-U interface in the related art; the protocol stack and the setup process of the X-1 interface in the preferred embodiment of the present invention are the same as those of the S1-C interface in the related art.

In the fifth embodiment shown in FIG. 18, processing the control plane data according to the control plane link comprises: in the uplink direction: the UE sending data to one or more eNodeBs via one or more radio interfaces, for the small enodeB, it also needing to send data to the macro eNodeB via the S1-MME2 interface, the macro eNodeB sending data to the MME via the S1-MME1 interface; in the downlink direction: the MME sending data to the macro eNodeB via the S1-MME1 interface, the macro eNodeB sending data to the small eNodeB via the S1-MME2 interface or to the UE directly via the radio interface and the small eNodeB sending data to UE via the radio interface. Wherein the control plane link between the small eNodeB and the UE may exist or may not exist, and if not, the control plane between the UE and the small cell eNodeB needs to be forwarded via the macro eNodeB (ie, X-3 interface).

Processing the user plane data according to the user plane link comprises: in the uplink direction: the UE sending data to one or more eNodeBs via one or more radio interfaces, one or more eNodeBs sending the data to the user plane gateway via the S1-U2 interface, and the user plane gateway sending the data to the SGW via the S1-U1 interface; in the downlink direction: the SGW sending the data to the user plane gateway via the S1-U1 interface, the user plane gateway sending the data to one or more eNodeBs via the S1-U2 interface, and the eNodeB sending the data to the UE via the radio interface.

Figure 19:
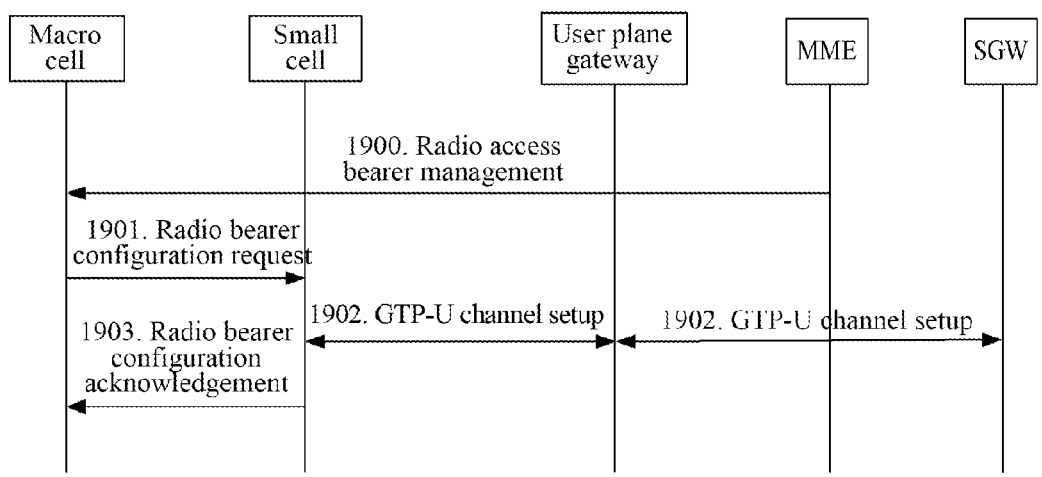
FIG. 19 is a schematic diagram of the GTP-U channel setup process of the fifth embodiment of the small cell eNodeB access system in accordance with an embodiment of the present invention.

FIG. 19 is a schematic diagram of the GTP-U channel setup process of the fifth embodiment of the small cell eNodeB access system in accordance with the embodiment of the present invention, as shown in FIG. 19, it comprises:

step 1900: the MME sends a radio access bearer management message to the macro cell via the S1-MME interface.

Step 1901: the macro cell sends the small cell a radio bearer configuration request message for requesting to set up a GTP-U channel.

Step 1902: it is to set up the GTP-U channel between the small cell and the user plane gateway, as well as between the user plane gateway and the SGW.

Step 1903: the small cell sends the macro cell a radio bearer configuration acknowledgement message to confirm that the GTP-U channel of the core network is set up.

Figure 20:
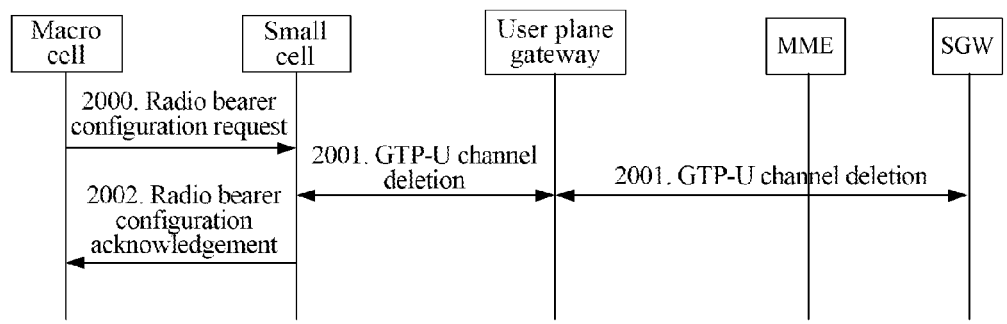
FIG. 20 is a schematic diagram of the GTP-U channel deletion process of the fifth embodiment of the small cell eNodeB access system in accordance with an embodiment of the present invention.

FIG. 20 is a schematic diagram of the GTP-U channel deletion process of the fifth embodiment of the small cell eNodeB access system in accordance with the embodiment of the present invention, as shown in FIG. 20, it comprises:

step 2000: the macro cell sends the small cell a radio bearer configuration request message for requesting to delete the GTP-U channel.

Step 2001: it is to delete the GTP-U channel between the small cell and the user plane gateway as well as between the user plane gateway and the SGW.

Step 2002: the small cell sends a GTP-U channel deletion acknowledgement message to the macro cell.

Figure 21:
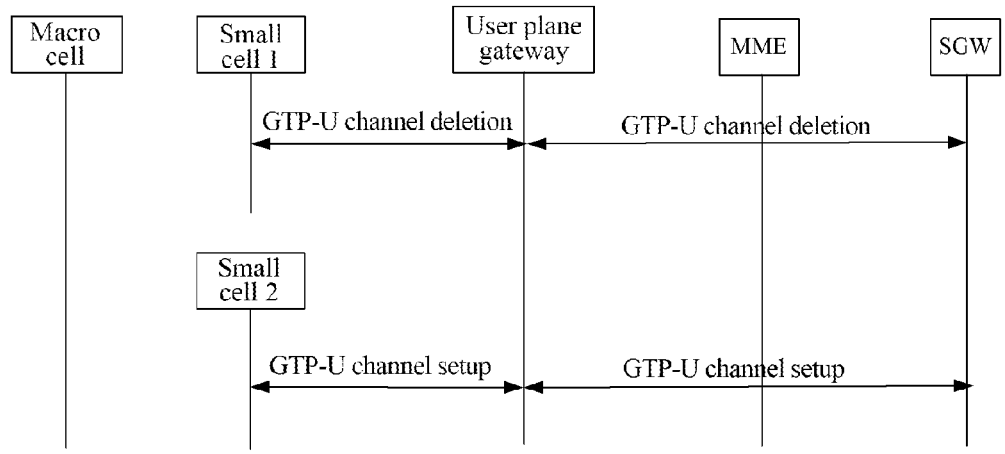
FIG. 21 is a schematic diagram of the GTP-U channel replacement process of the fifth embodiment of the small cell eNodeB access system in accordance with an embodiment of the present invention.

FIG. 21 is a schematic diagram of the GTP-U channel replacement process of the fifth embodiment of the small cell eNodeB access system in accordance with the embodiment of the present invention, assuming that the UE moves from the small cell 1 to the small cell 2, as shown in FIG. 21, it comprises:

when the UE moves from the small cell 1 to the small cell 2, the macro cell executes the process shown in FIG. 19 and sets up the GTP-U channel from the small cell 2 to the SGW, and the GTP-U channel comprises two GTP-U channels between the SGW and the user plane gateway and between the user plane gateway and the small cell 2. And in accordance with the process of FIG. 20, it deletes the GTP-U channel in the small cell 1.

When the UE shown in FIG. 21 in the embodiment of the present invention moves between the small cells, the management of GTP-U channel does not affect the core network, so that the introduction of a large number of small cells at the radio side becomes possible.

Figure 22:
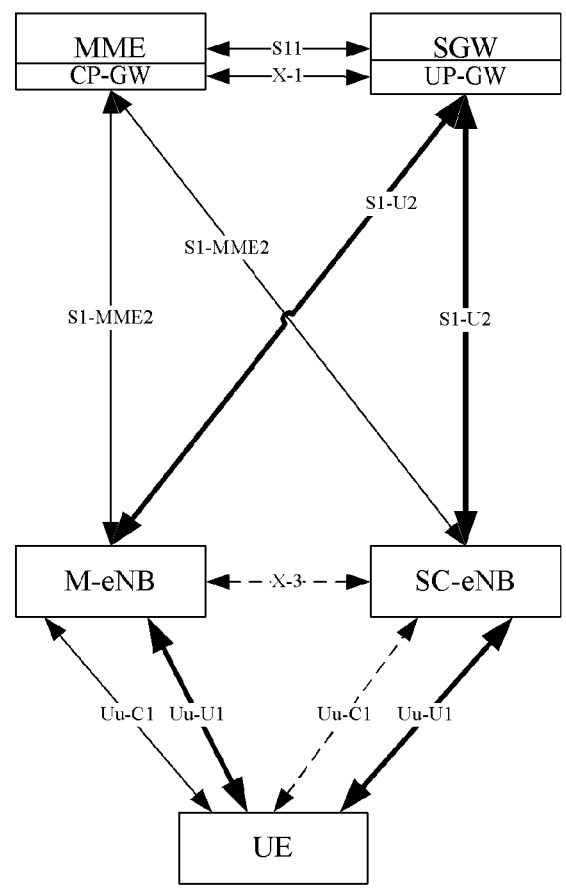
FIG. 22 is a schematic diagram of the logic function structure of a sixth embodiment of the small cell eNodeB access system in accordance with an embodiment of the present invention.

FIG. 22 is a schematic diagram of the logic function structure of the sixth embodiment of the small cell eNodeB access system according to the embodiment of the present invention, in the present embodiment, the user plane gateway is set in the SGW and becomes SGW+, and the control plane gateway is set in the MME and becomes MME+, as shown in FIG. 22, the difference from the structure of the first embodiment shown in FIG. 5 is that, the S1-MME1 interface becomes an internal interface of the MME network element, the S1-U1 interface becomes an internal interface of the SGW network element, the S1-MME2 interface becomes an interface between the MME and the macro eNodeB and between the MME and the small eNodeB, the S1-U2 interface becomes an interface between the SGW and the macro eNodeB and between the SGW and the S-eNB, and the X-1 interface becomes one of the interfaces between the MME and the SGW. Specifically, as shown in FIG. 22, the functions of the macro cell and the small cell are consistent with those in the related art, the functions of the other network nodes are respectively as follows:

the MME is provided with the control plane gateway; and it is set to connect to the SGW via the S11 interface and the X-1 interface, and respectively connect to the macro eNodeB and the small cell eNodeB via the S1-MME2 interface. In addition to having the existing functions of the MME in the LTE system Release 11, it is further set to support managing two S1-U2 interfaces for one user to respectively connect to different eNodeBs.

The SGW is provided with a user plane gateway. It is connected to the MME via the S11 interface and the X-1 interface, and respectively connected to the macro eNodeB and the small cell eNodeB via the S1-U2 interface. In addition to the existing function of the SGW in the LTE system Release11, it is further set to support managing two S1-U2 interfaces for one user to respectively connect to different eNodeBs.

In the sixth embodiment of the present invention shown in FIG. 22, its network access method is consistent with that in the related art; the methods for setting up, deleting and replacing the GTP-U channel are consistent to those in the related art. However, it can be seen that, in the present embodiment, due to the separation of the control plane and the data plane, the UE has data transmission and reception with two different eNodeBs such as macro cell (eNodeB) and small cell (eNodeB) at the same time, thereby increasing the user throughput and enhancing the mobile performance, and solving the problem of frequent information exchange between nodes when the user switches between the cells so as to cause an impact on the core network, thus avoiding the signaling impact on the core network, and further achieving the introduction of a large number of small cell eNodeBs at the radio side.

The above description is only preferred embodiments of the present invention and is not intended to limit the protection scope of the patent document. Any modifications, equivalents, improvements made within the spirit and principle of the patent document should be included within the protection scope of the patent document.

INDUSTRIAL APPLICABILITY

In the embodiment of the present invention, it respectively sets up the control plane link and the user plane link, the small cell eNodeB access system processes the control plane data of an access UE via the set up control plane link, and processes the user plane data of the access UE via the set up user plane link. In the embodiment of the present invention, it makes the UE have data transmission and reception with two different eNodeBs such as macro cell (eNodeB) and small cell (eNodeB) simultaneously by separating the control plane with the data plane, so as to increase the user throughput and enhance the mobility performance, and to solve the problem that the user switches between the cells so that information exchanges frequently between nodes and so as to cause an impact on the core network, and further to realize the introduction of a large number of small cell eNodeBs at the radio side.

What is claimed is:

1. A small cell eNodeB access system, comprising:
   a control plane gateway, which is connected to a radio access network and a core network, and set to set up a control plane link between the core network and the radio access network; as an aggregation and distribution node of control plane signalings, aggregate and send signalings from different radio access network nodes to the core network, or distribute signalings from the core network to different radio access network nodes; and manage and coordinate one or more radio access network nodes;
   a user plane gateway, which is connected to the radio access network and the core network, and set to set up a user plane link between the core network and the radio access network; as an aggregation and distribution node of user plane data, aggregate and send data from different radio access network nodes to the core network, or distribute data come from the core network to different radio access network nodes; and
   a connection link set up between the control plane gateway and the user plane gateway;
   the system further comprising a mobility management entity (MME) connecting with the control plane gateway, a serving gateway (SGW) connecting with the user plane gateway and the MME, a macro eNodeB connecting with the control plane gateway and the user plane gateway respectively, and a small cell eNodeB respectively connecting with the control plane gateway and the user plane gateway.

2. The small cell eNodeB access system of claim 1, wherein the control plane gateway is further set to implement control and management of the user plane gateway via the set up connection link, and
   wherein the control and management of the user plane gateway comprises:
   controlling setup, deletion and modification of connections between the user plane gateway and the core network, as well as between the user plane gateway and the radio access network node.

3. The small cell eNodeB access system of claim 1, wherein:
   there are one or more control plane gateways; and
   there are one or more user plane gateways.

4. The small cell eNodeB access system of claim 1, wherein:
   the user plane gateway and the control plane gateway are independent physical nodes;
   the MME is set to connect to the control plane gateway via a S1-MME1 interface, connect to the SGW via a S11 interface; and also set to support managing a control plane link with the control plane gateway;
   the SGW is set to connect to the user plane gateway via a S1-U1 interface; and also set to support managing a S1-U1 interface connection with the user plane gateway;
   the control plane gateway is set to connect to the MME via a S1-MME1 interface, and connect to the macro eNodeB and/or small cell eNodeB via a S1-MM2 interface, connect to the user plane gateway via a X-1 interface; and further set to support a function of managing the control plane link with the MME and managing a control plane link with an eNodeB, and to manage the S1-U1 interface connection set up between the user plane gateway and the SGW as well as a S1-U2 interface connection set up between the user plane gateway and the eNodeB;
   the user plane gateway is set to connect to the SGW via the S1-U1 interface, connect to the macro eNodeB or small cell eNodeB via a S1-U2 interface and connect to the control plane gateway via the X-1 interface; and set to, under control of the control plane gateway, support managing the S1-U1 interface connection with the SGW as well as managing the S1-U2 interface connection with the eNodeB;
   the macro eNodeB is set to connect to the control plane gateway via a S1-MME2 interface, and connect to the user plane gateway via the S1-U2 interface; and further set to support managing the control plane link with the control plane gateway and managing a S1-U2 interface connection with the user plane gateway;
   the small cell eNodeB is set to connect to the user plane gateway via a S1-U2 interface, connect to the control plane gateway via a S1-MME2 interface; also set to support managing the control plane link with the control plane gateway and managing a S1-U2 interface connection with the user plane gateway.

5. The small cell eNodeB access system of claim 4, wherein:
   the control plane gateway is further set to connect to other control plane gateways via a X-C interface, used for an inter-node negotiation when moving across the control plane gateways;
   or
   the user plane gateway is further set to connect to other user plane eNodeBs via a X-U interface, used for transmitting data between nodes when moving across the user plane gateways.

6. The small cell eNodeB access system of claim 1, wherein,
   the control plane gateway and the user plane gateway are co-located in a same physical entity, in this case, a X-1 interface between the control plane gateway and the user plane gateway is an internal interface;
   or
   the control plane gateway and the user plane gateway are co-located and set in a macro eNodeB;
   the MME is set to connect to the macro eNodeB via a S1-MME1 interface, connect to the SGW via a S11 interface; also set to support managing a control plane link with the control plane gateway set in the macro eNodeB;
   the SGW is set to connect to the macro eNodeB via a S1-U1 interface; further set to support managing a S1-U1 connection with the user plane gateway set in the macro eNodeB;
   the macro eNodeB is set to connect to the MME via a S1-MME1 interface, and have a S1-U2 interface and a S1-MME2 interface with the small cell eNodeB; and further set to support managing a control plane link with the small cell eNodeB, and support managing a S1-U2 connection with the small cell eNodeB;
   the small cell eNodeB is set to have the S1-U2 interface and the S1-MME2 interface with the macro eNodeB;

also set to support managing the control plane link and the S1-U2 connection with the macro eNodeB;

or the control plane gateway and the user plane gateway are co-located and set in a macro eNodeB;

one gateway is also set between the macro eNodeB and a small cell eNodeB, and also responsible for managing a control plane and user plane of the small cell eNodeB;

the MME is set to connect to the macro eNodeB via a S1-MME1 interface, and connect to the SGW via a S11 interface; and further set to support managing a control plane link with the control plane gateway set in the macro eNodeB;

the SGW is set to connect to the macro eNodeB via a S1-U1 interface; further set to support managing a S1-U1 connection with the user plane gateway set in the macro eNodeB;

the macro eNodeB is set to connect to the MME via the S1-MME1 interface and set up S1-U2 interface and S1-MME2 interface connections with the small cell eNodeB via a gateway; also set to support managing a control plane link with the gateway;

the gateway is set to support managing a control plane link and user plane link with an eNodeB;

the small cell eNodeB is set to set up the S1-U2 interface and S1-MME2 interface connections with the macro eNodeB via the gateway; further set to support setting up a data radio bearer (DRB) of LTE system with a UE and communicating in the DRB, and support managing a control plane link and a S1-U2 interface connection with the gateway, the small cell eNodeB access system further comprises a X-3 interface connection set up between the macro eNodeB and the small cell eNodeB via the gateway.

7. The small cell eNodeB access system of claim 4, wherein:

the control plane gateway is set in a macro eNodeB, and the user plane gateway is an independent entity;

the MME is set to connect to the macro eNodeB via a S1-MME1 interface, and connect to the SGW via a S11 interface;

the SGW is set to connect to the user plane gateway via a S1-U1 interface; also set to support managing a S1-U1 interface connection with the user plane gateway;

the macro eNodeB is provided with a control plane gateway; set to connect to the MME via a S1-MME1 interface, connect to a small cell eNodeB via a S1-MM2 interface, wherein interfaces between the macro eNodeB and the user plane gateway comprise a X-1 interface and a S1-U2 interface; further set to support managing a S1-U2 interface connection with a user plane gateway, support managing a control plane link with the small cell eNodeB; control the user plane gateway to manage the S1-U1 interface connection between the user plane gateway and the SGW, as well as a S1-U2 interface connection between the user plane gateway and an eNodeB;

the user plane gateway is set to connect to the SGW via the S1-U1 interface, connect to the macro eNodeB via the S1-U2 interface and X-1 interface, connect to the small cell eNodeB via a S1-U2 interface; further set to support managing the S1-U1 interface connection with the SGW, as well as managing the S1-U2 interface connection with the eNodeB;

the small cell eNodeB is set to connect to the user plane gateway via the S1-U2 interface, connect to the macro eNodeB via the S1-MME2 interface; support setting up a data radio bearer of LTE system with a UE and communicating in the DRB, as well as support managing a control plane link with the control plane gateway and manage a S1-U2 interface connection with the user plane gateway;

or the macro eNodeB and the small cell eNodeB are connected via a X-3 interface;

or the user plane gateway is set in the SGW; the control plane gateway is set in the MME;

the MME is provided with a control plane gateway; and the MME is set to connect to the SGW via a S11 interface and a X-1 interface, and respectively connect to the macro eNodeB and the small cell eNodeB via a S1-MME2 interface; also set to support managing two S1-MME2 interfaces for one user to respectively connect to different eNodeBs;

the SGW is provided with a user plane gateway; and the SGW is set to connect to the MME via the S11 interface and the X-1 interface, and respectively connect to the macro eNodeB and the small cell eNodeB via a S1-U2 interface; and further set to support managing two S1-U2 interfaces for one user to respectively connect to different eNodeBs.

8. A method for a small cell eNodeB access system implementing network access, wherein the small cell eNodeB access system is provided with, a control plane gateway, which is connected to a radio access network and a core network, and set to set up a control plane link between the core network and the radio access network;

a user plane gateway, which is connected to the radio access network and the core network, and set to set up a user plane link between the core network and the radio access network;

a connection link which is set up between the control plane gateway and the user plane gateway;

the method comprises:

respectively setting up the control plane link and the user plane link;

processing control plane data of an access UE through the set up control plane link, and processing user plane data of the access UE through the set up user plane link;

wherein the small cell eNodeB access system further comprises a mobility management entity (MME) connecting with the control plane gateway, a serving gateway (SGW) connecting with the user plane gateway and the MME, a macro eNodeB connecting with the control plane gateway and the user plane gateway respectively, and a small cell eNodeB respectively connecting with the control plane gateway and the user plane gateway.

9. The method of claim 8, further comprising:

via the set up connection link, the control plane gateway controlling and managing the user plane gateway, wherein, the control plane gateway controlling and managing the user plane gateway comprises:

setting up, deleting, and modifying a connection between the user plane gateway and the core network, as well as, setting up, deleting and modifying a connection between the user plane gateway and a radio access network node.

10. The method of claim 8, wherein,
there are two or more user plane gateways;
the method further comprises:
setting up a connection link between the user plane gateways; through the set up connection link, implementing transmitting data between nodes when a UE moves across the user plane gateways.

11. The method of claim 8, wherein, the method further comprises:
the control plane gateway completing an inter-node negotiation via the connection link when a UE moves across the control plane gateways.

12. The method of claim 8, wherein,
said processing the control plane data of the access UE via the set up control plane link comprises:
via the set up control plane link, the control plane gateway processing the control plane data, aggregating and sending signalings from different radio access network nodes to the core network, or distributing signalings from the core network to different radio access network nodes.

13. The method of claim 12, wherein,
the aggregating or distributing comprises:
managing signaling connections between the core network and the control plane gateway, as well as the control plane gateway and the radio access network nodes;
maintaining UE-related context information, comprising mapping relationships of signaling connections between the core network and the control plane gateway, as well as between the control plane gateway and the radio access network nodes;
managing the signaling connections according to signalings of the core network or the radio access network nodes.

14. The method of claim 13, further comprising:
when a UE supports a plurality of streams, the UE storing the signaling connections between the control plane gateway and a plurality of radio access network nodes.

15. The method of claim 13, further comprising:
instructing the user plane gateway to manage a corresponding data connection;
or
wherein the mapping relationship is a one-to-one mapping relationship; forwarding the signaling according to the mapping relationship; or, the mapping relationship is a one-to-many relationship mapping, forwarding by proxy the signaling according to a specified rule;
or
wherein, when there is moving across the control plane gateways, between the control plane gateways, the method further comprises:
migrating context configuration information related to a corresponding UE or an air interface connection.

16. The method of claim 8, wherein,
said processing the user plane data of the access UE via the set up user plane link comprises:
through the set up user plane link, the user plane gateway processing the user plane data, aggregating and sending data from different radio access network nodes to the core network, or distributing data from the core network to different radio access network nodes.

17. The method of claim 16, wherein,
the aggregating or distributing comprises:
managing data channels between the core network and the user plane gateway, as well as between the user plane gateway and the radio access network;
maintaining a mapping relationship of data channels between the core network and the user plane gateway as well as between the user plane gateway and the radio access network nodes;
and forwarding data in accordance with a mapping relationship, and managing the mapping relationship.

18. The method of claim 17, wherein,
the mapping relationship is a one-to-one mapping relationship; or
the mapping relationship is a one-to-many mapping relationship, in this case,
the user plane gateway maintains the one-to-many relationship in context information of one UE: in an uplink direction, the user plane gateway aggregates a plurality of data channels into one data channel to transmit; in a downlink direction, the user plane gateway distributes data according to a preset rule.

19. The method of claim 18, further comprising,
when there is moving across the user plane gateways, managing including setting up, deleting and modifying a data channel between the user plane gateways; and, maintaining the mapping relationship of data channels between the access network nodes or the core network and the user plane gateway, forwarding data according to the mapping relationship, and supporting a management of the mapping relationship.

* * * * *